United States Patent
Yamashita et al.

(10) Patent No.: US 11,241,793 B2
(45) Date of Patent: Feb. 8, 2022

(54) METHOD FOR ESTIMATING POSITION WHERE ABNORMALITY HAS OCCURRED, AND PROGRAM FOR ESTIMATING POSITION WHERE ABNORMALITY HAS OCCURRED

(71) Applicant: KAWASAKI JUKOGYO KABUSHIKI KAISHA, Kobe (JP)

(72) Inventors: Ryo Yamashita, Kobe (JP); Toshikazu Sugimoto, Himeji (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 63 days.

(21) Appl. No.: 16/753,407

(22) PCT Filed: Oct. 2, 2018

(86) PCT No.: PCT/JP2018/036762
§ 371 (c)(1),
(2) Date: Apr. 3, 2020

(87) PCT Pub. No.: WO2019/069877
PCT Pub. Date: Apr. 11, 2019

(65) Prior Publication Data
US 2020/0306971 A1 Oct. 1, 2020

(30) Foreign Application Priority Data

Oct. 3, 2017 (JP) .............................. JP2017-193595

(51) Int. Cl.
*B25J 9/16* (2006.01)
*B25J 9/12* (2006.01)
*B25J 19/06* (2006.01)

(52) U.S. Cl.
CPC .............. *B25J 9/1674* (2013.01); *B25J 9/12* (2013.01); *B25J 9/126* (2013.01); *B25J 19/06* (2013.01);
(Continued)

(58) Field of Classification Search
CPC ... B25J 9/12; B25J 9/126; B25J 9/1653; B25J 9/1674; B25J 19/06; G05B 23/02;
(Continued)

(56) References Cited

U.S. PATENT DOCUMENTS

| 4,647,827 A | * | 3/1987 | Toyoda | ............... G01D 5/2458 318/592 |
| 2004/0215370 A1 | * | 10/2004 | Asama | .................. A61G 5/048 700/245 |

(Continued)

FOREIGN PATENT DOCUMENTS

| JP | H07-100724 A | 4/1995 |
| JP | H10-254539 A | 9/1998 |

(Continued)

*Primary Examiner* — Dale Moyer
(74) *Attorney, Agent, or Firm* — Oliff PLC

(57) ABSTRACT

A method estimates a position where an abnormality has occurred. The method for estimating a position where an abnormality has occurred in a robot includes an abnormality detection step of detecting occurrence of an abnormality, and a position detection step of detecting a position where the abnormality has occurred when the occurrence of the abnormality is detected in the abnormality detection step.

9 Claims, 16 Drawing Sheets

(52) U.S. Cl.
CPC ... *B25J 9/1653* (2013.01); *G05B 2219/37525* (2013.01); *G05B 2219/42319* (2013.01); *G05B 2219/42323* (2013.01); *G05B 2219/50197* (2013.01)

(58) Field of Classification Search
CPC ........... G05B 2219/37525; G05B 2219/42319; G05B 2219/42323; G05B 2219/50197
See application file for complete search history.

(56) References Cited

U.S. PATENT DOCUMENTS

| | | | |
|---|---|---|---|
| 2009/0309531 A1* | 12/2009 | Hamahata | B25J 9/1674 318/565 |
| 2014/0201571 A1* | 7/2014 | Hosek | G05B 19/41875 714/26 |
| 2017/0341240 A1 | 11/2017 | Nakaya et al. | |
| 2018/0169864 A1* | 6/2018 | Haddadin | B25J 9/1674 |
| 2018/0268217 A1* | 9/2018 | Murase | B25J 19/021 |

FOREIGN PATENT DOCUMENTS

| | | |
|---|---|---|
| JP | 2001-333594 A | 11/2001 |
| JP | 2018-153880 A | 10/2018 |
| WO | 2016/103310 A1 | 6/2016 |
| WO | 2016/184451 A1 | 11/2016 |

* cited by examiner

[FIG. 1]
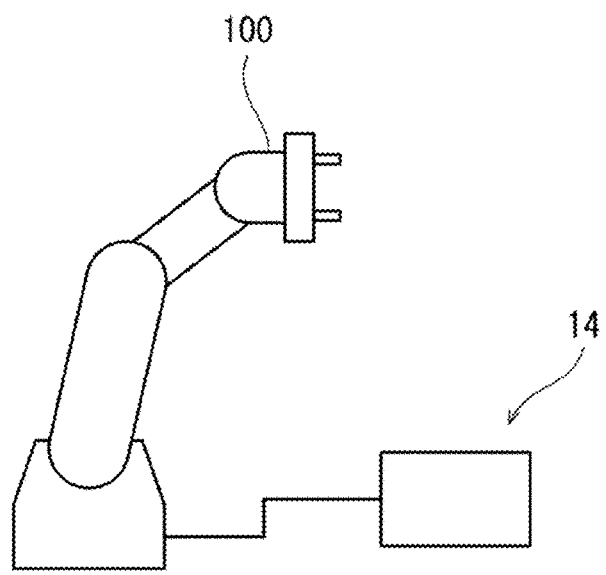

[FIG. 2]
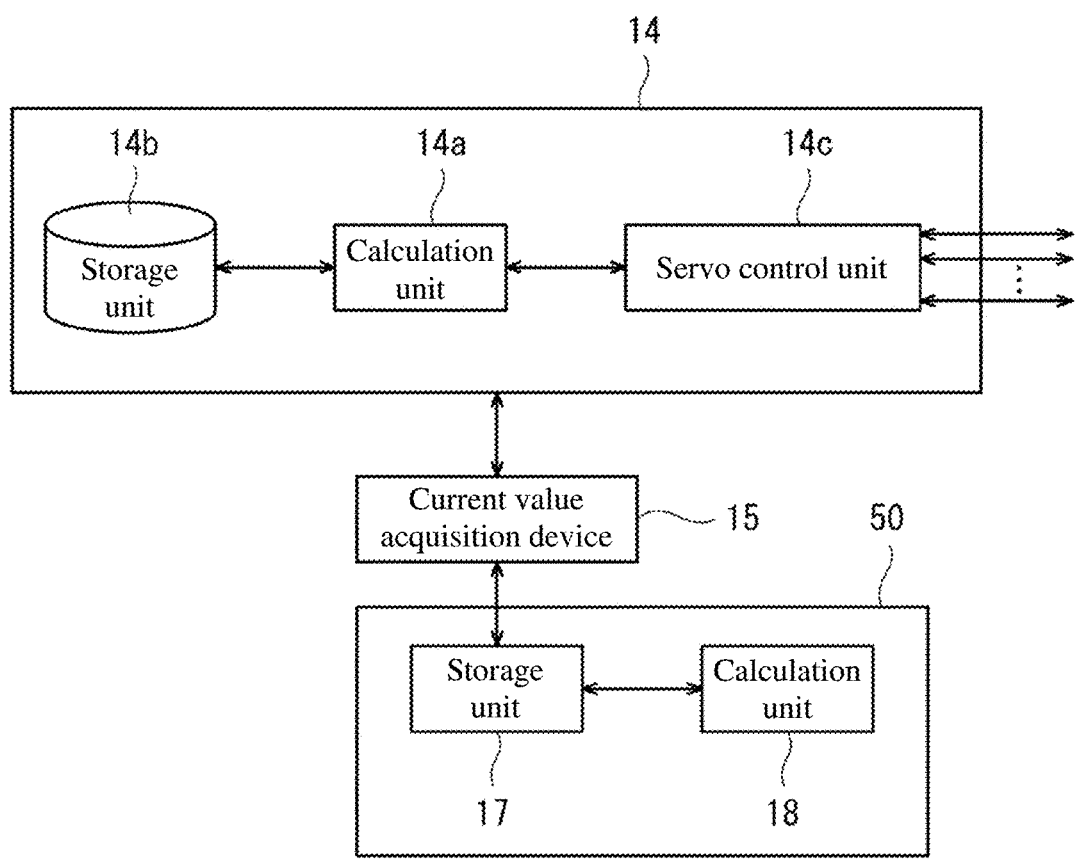

[FIG. 3]
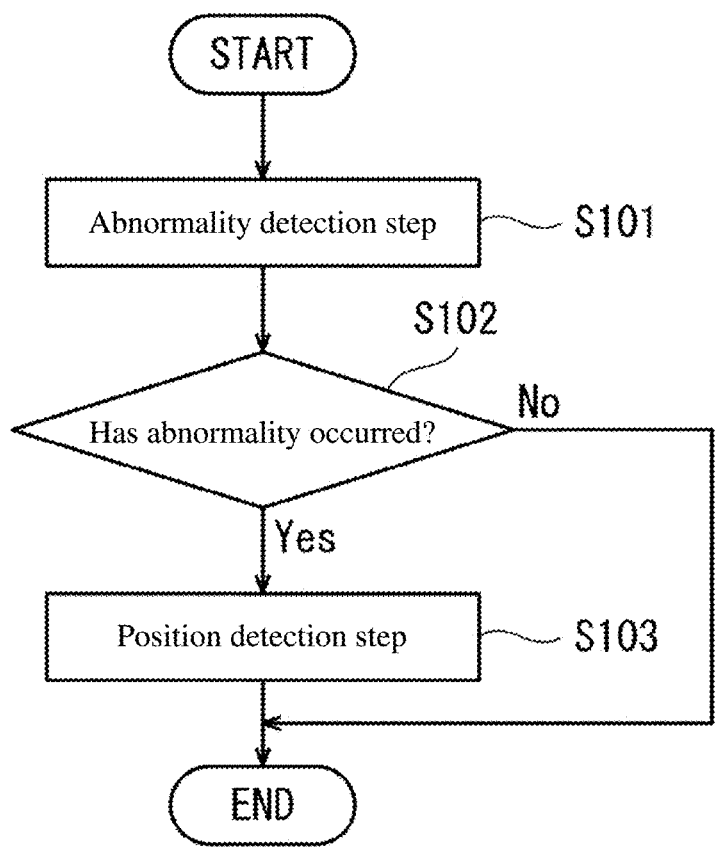

[FIG. 4]
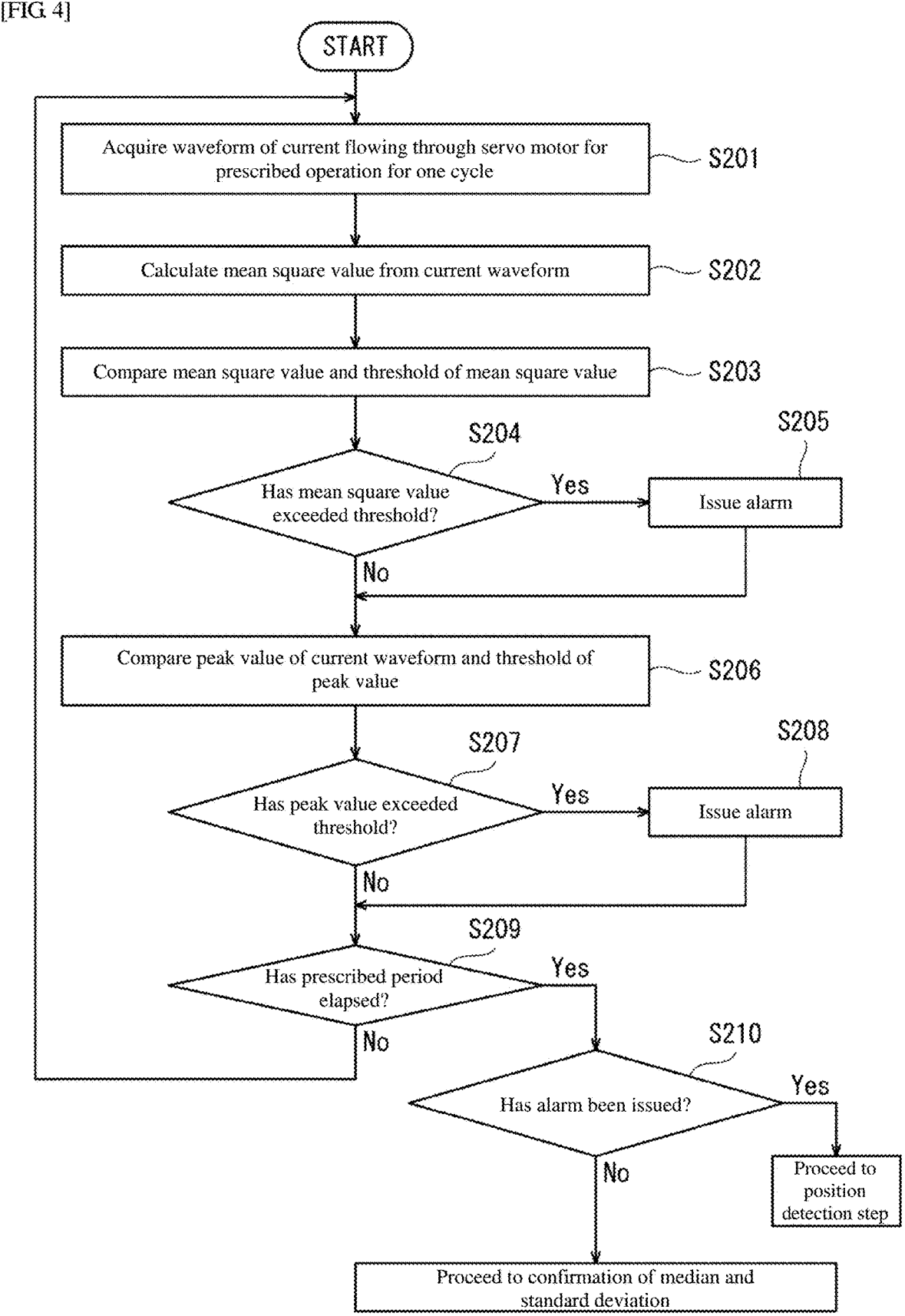

[FIG. 5]
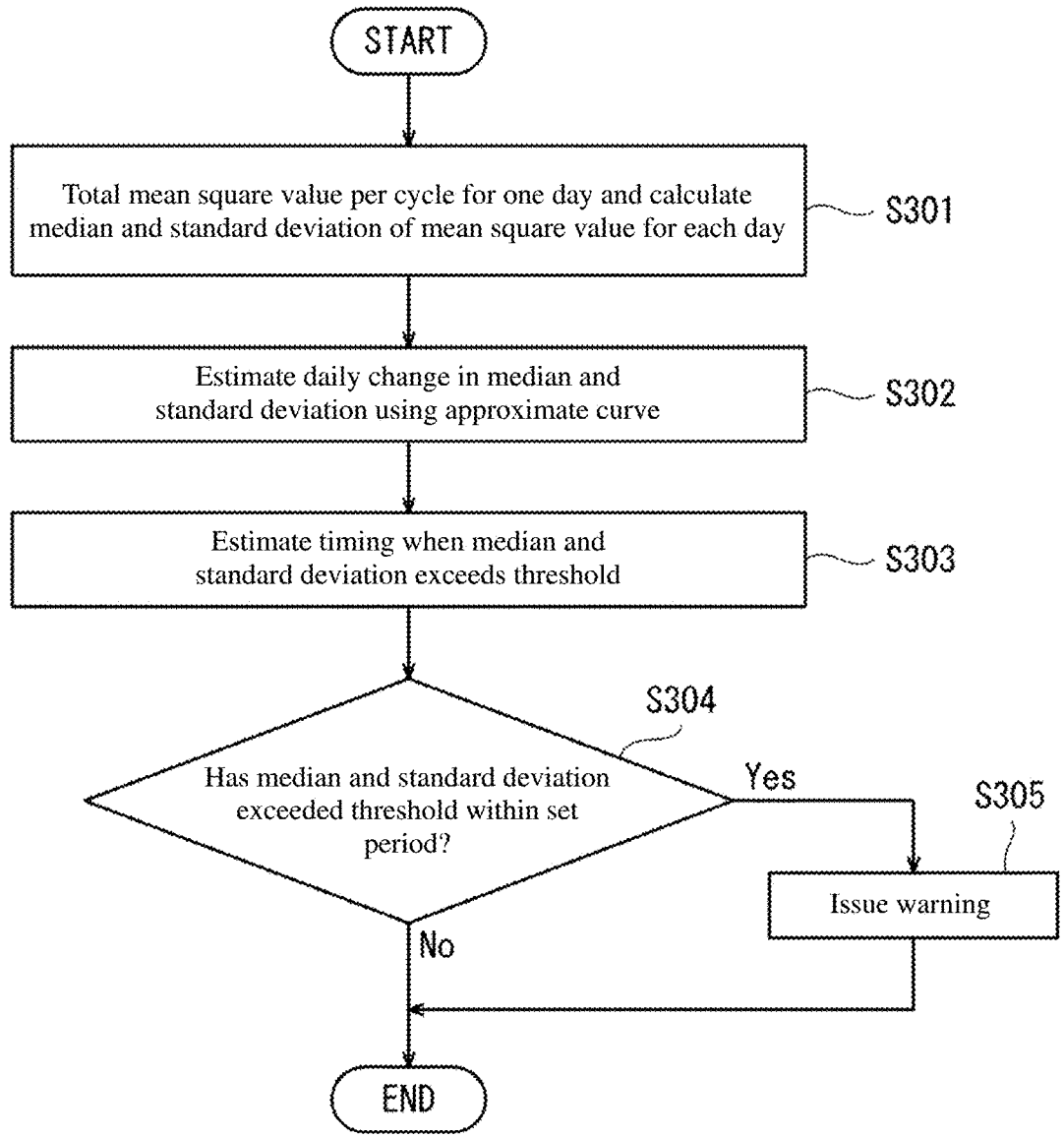

[FIG. 6]
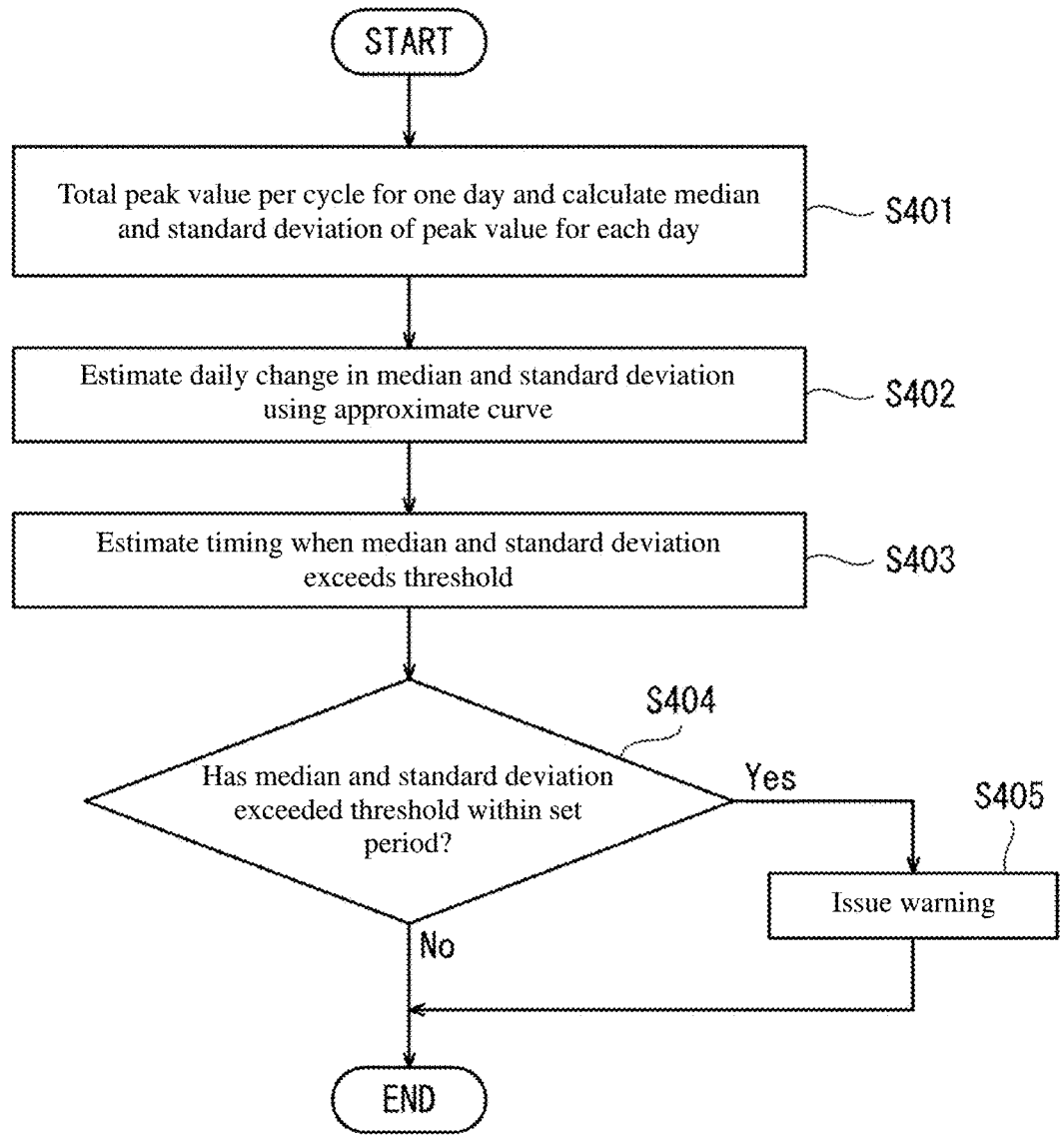

[FIG. 7]
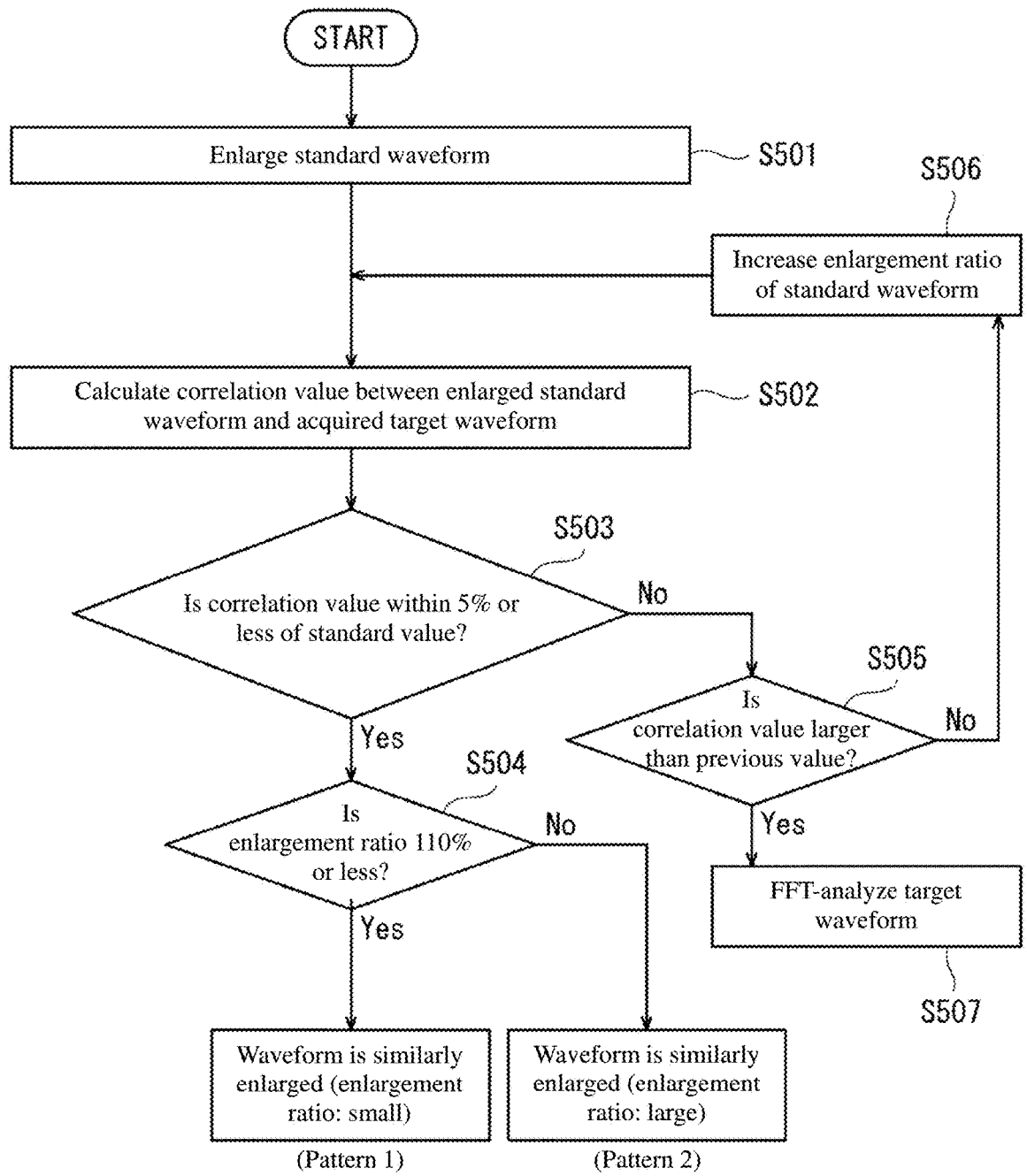

[FIG. 8]
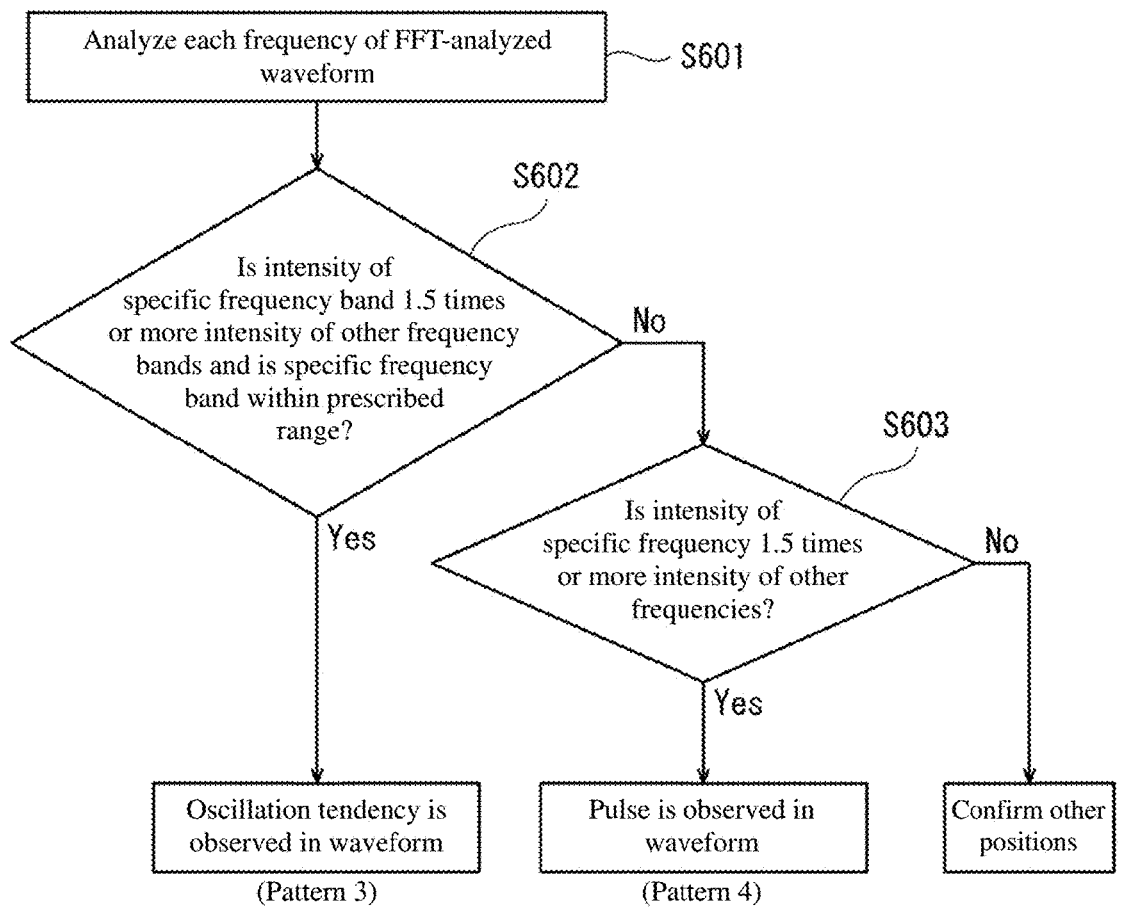

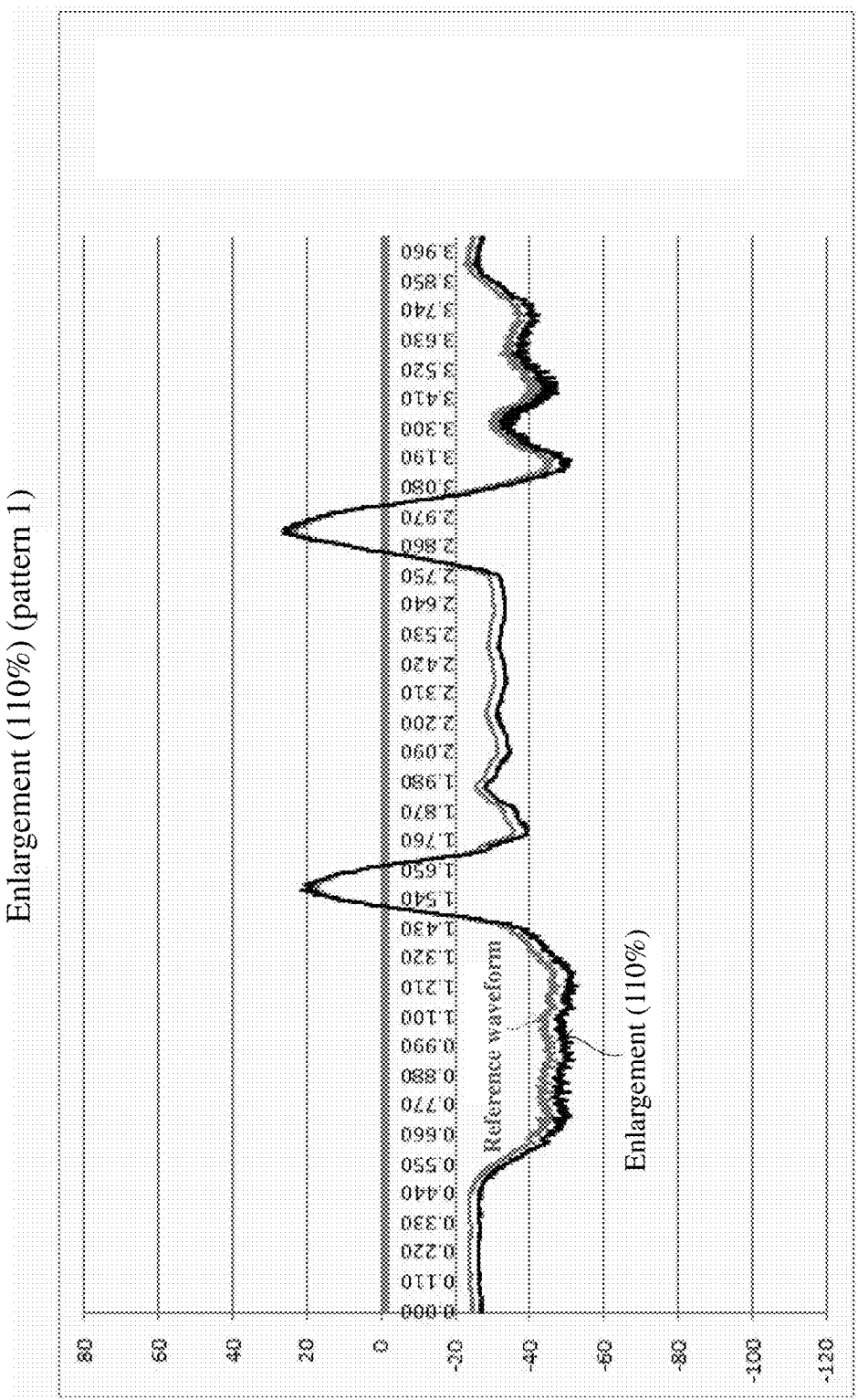
[FIG. 9]

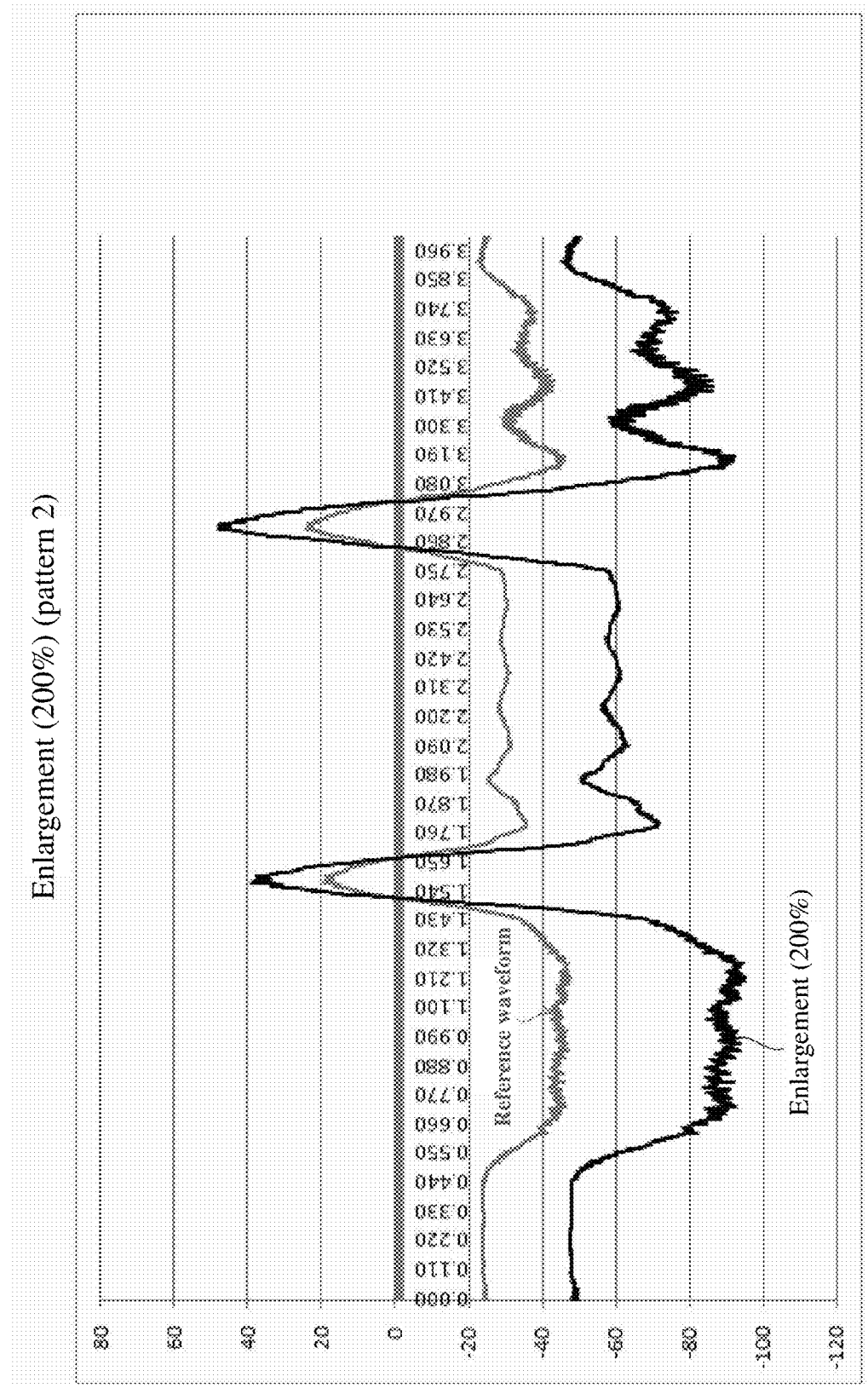
[FIG. 10]

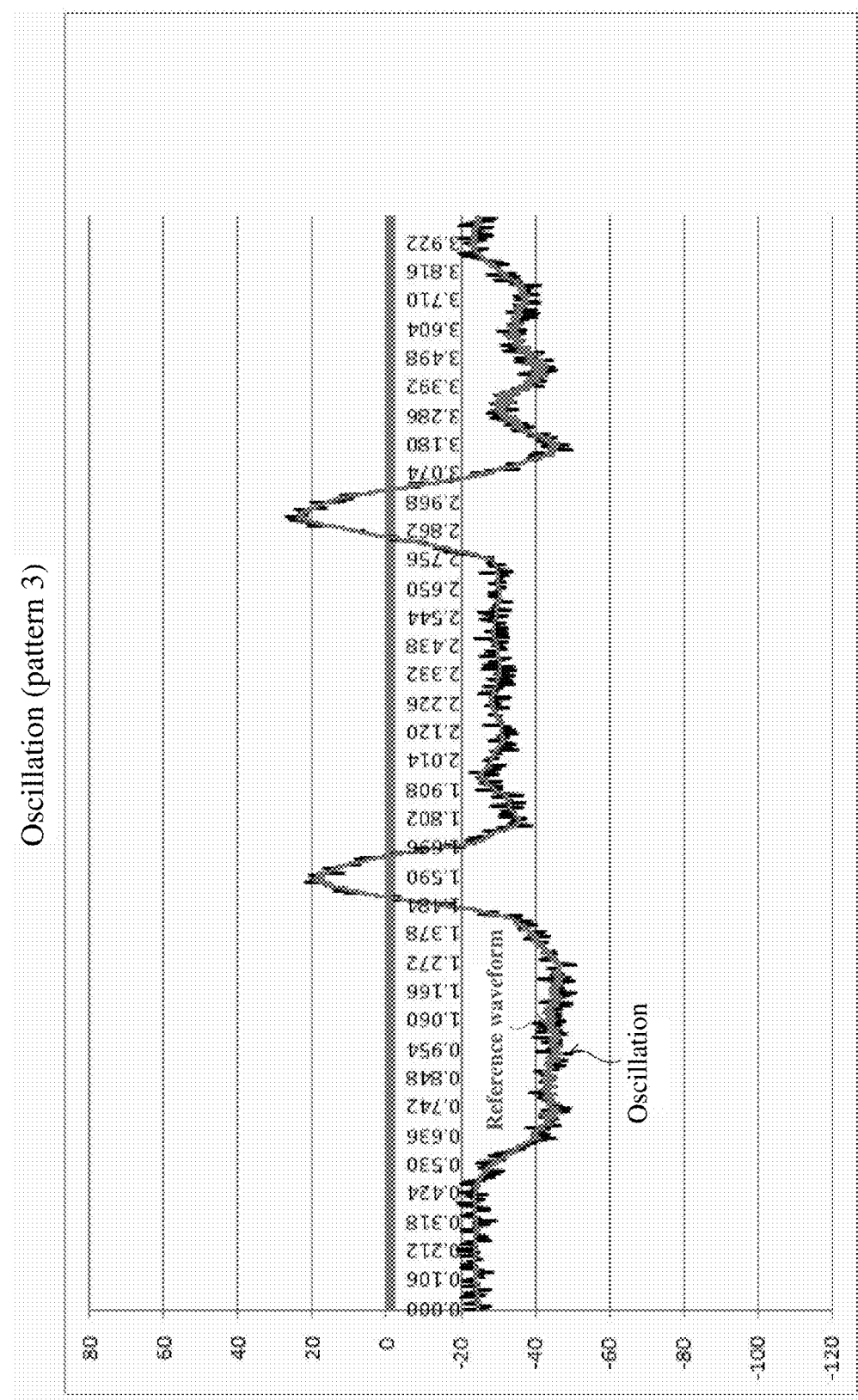
[FIG 11]

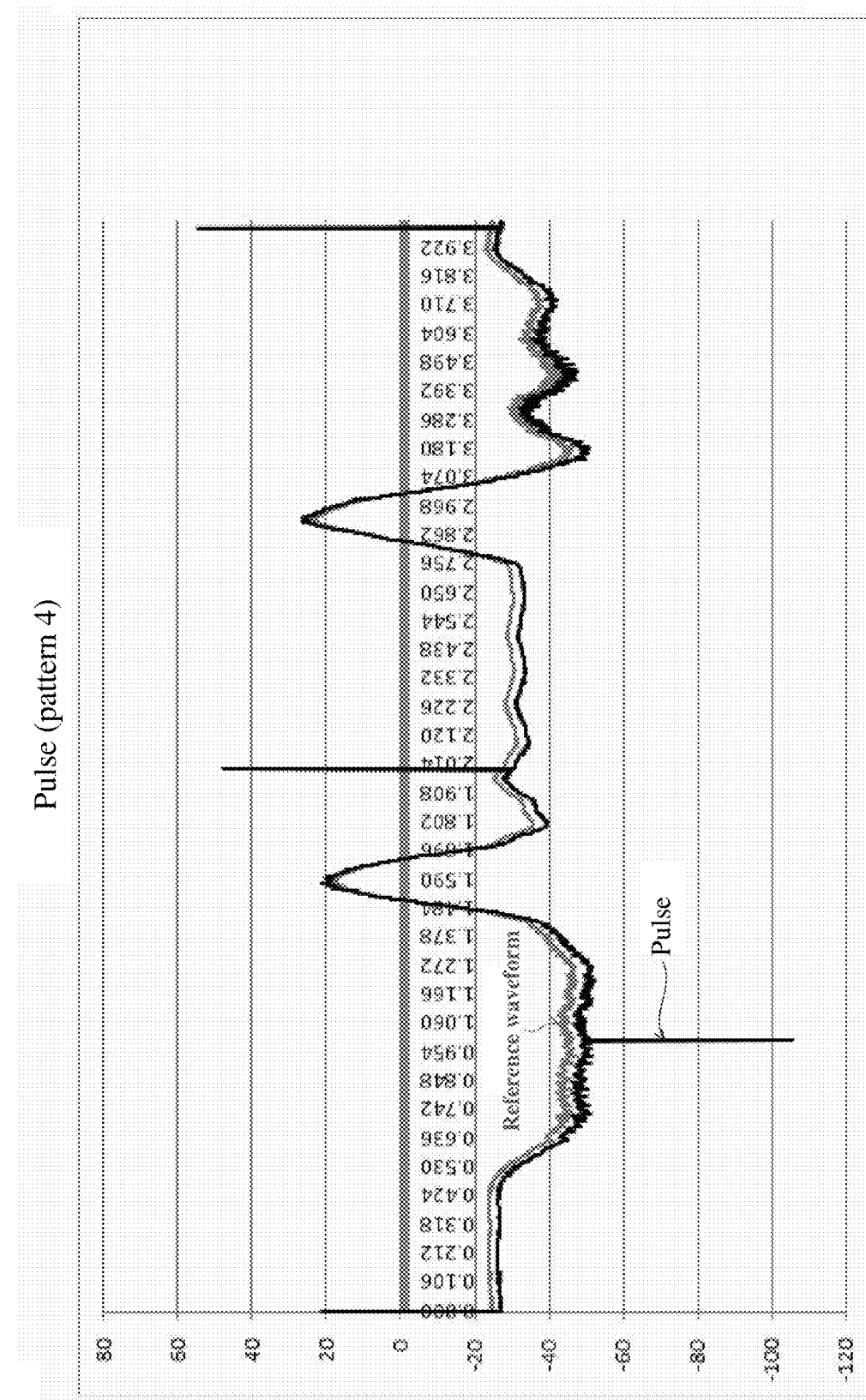
[FIG 12]

[FIG 13]

| Alarm or waning item | | | Enlargement (enlargement ratio: small) (pattern 1) | Enlargement (enlargement ratio: large) (pattern 2) | Oscillation (pattern 3) | Pulse (pattern 4) | Failure position |
|---|---|---|---|---|---|---|---|
| Motor current or command current | Mean square value | Median | O | | | | Failed reduction gear |
| | | | | O | | | Wear of inside-device harness or motor break (large resistance) |
| | | Standard deviation | | | O | | Large lost motion |
| | | | | | O | | Failed reduction gear |
| | Peak | Median | O | | | | Failed reduction gear |
| | | | | O | | | Wear of inside-device harness or motor break (large resistance) |
| | | Standard deviation | | | O | | Failed reduction gear |
| | | | | | | O | Instantaneous short circuit or ground fault in inside-device harness or motor UVW |
| | | | | | | O | Instantaneous disconnection in inside-device harness or motor break |
| | | | | | | O | Servo motor |

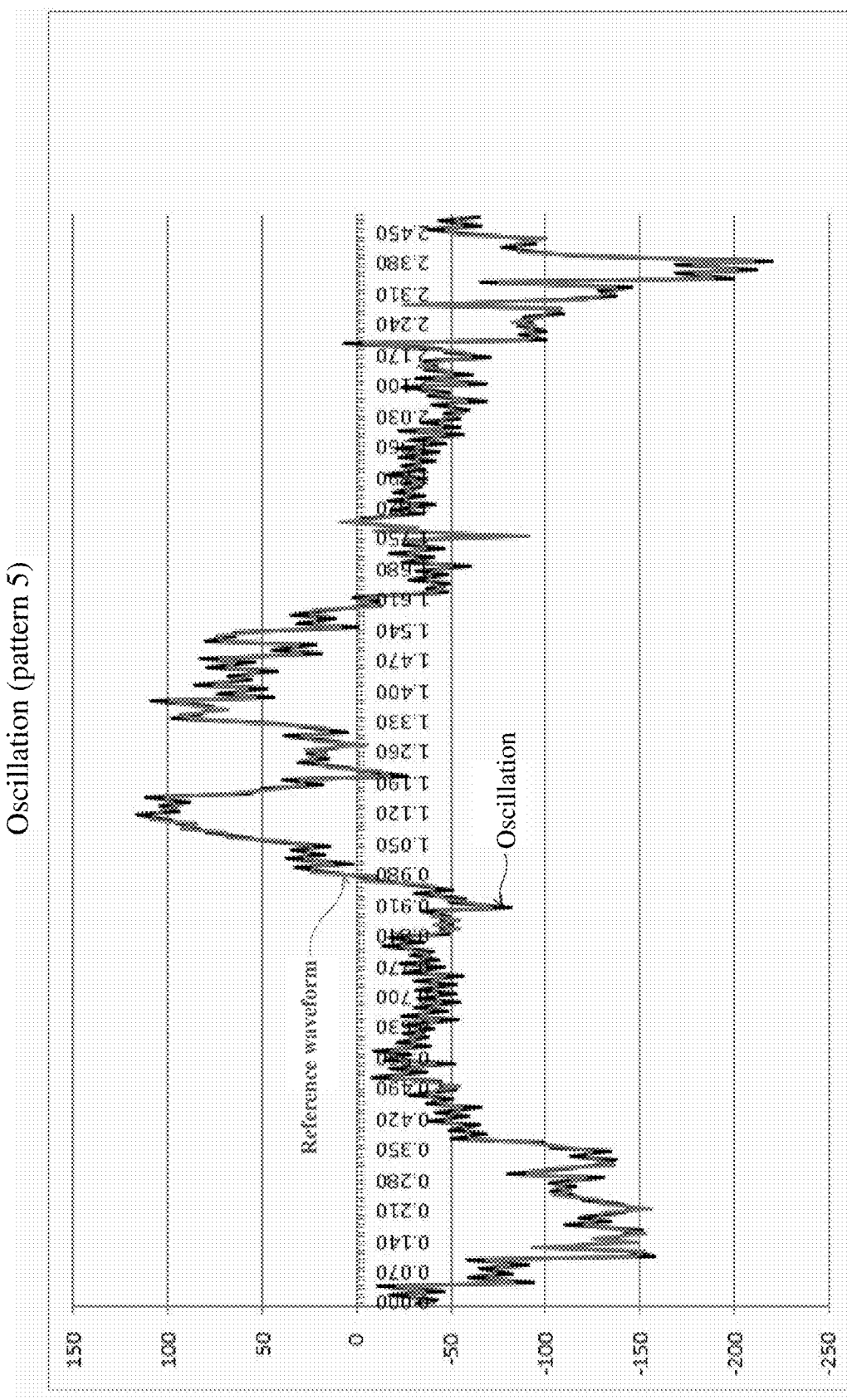
[FIG 14]

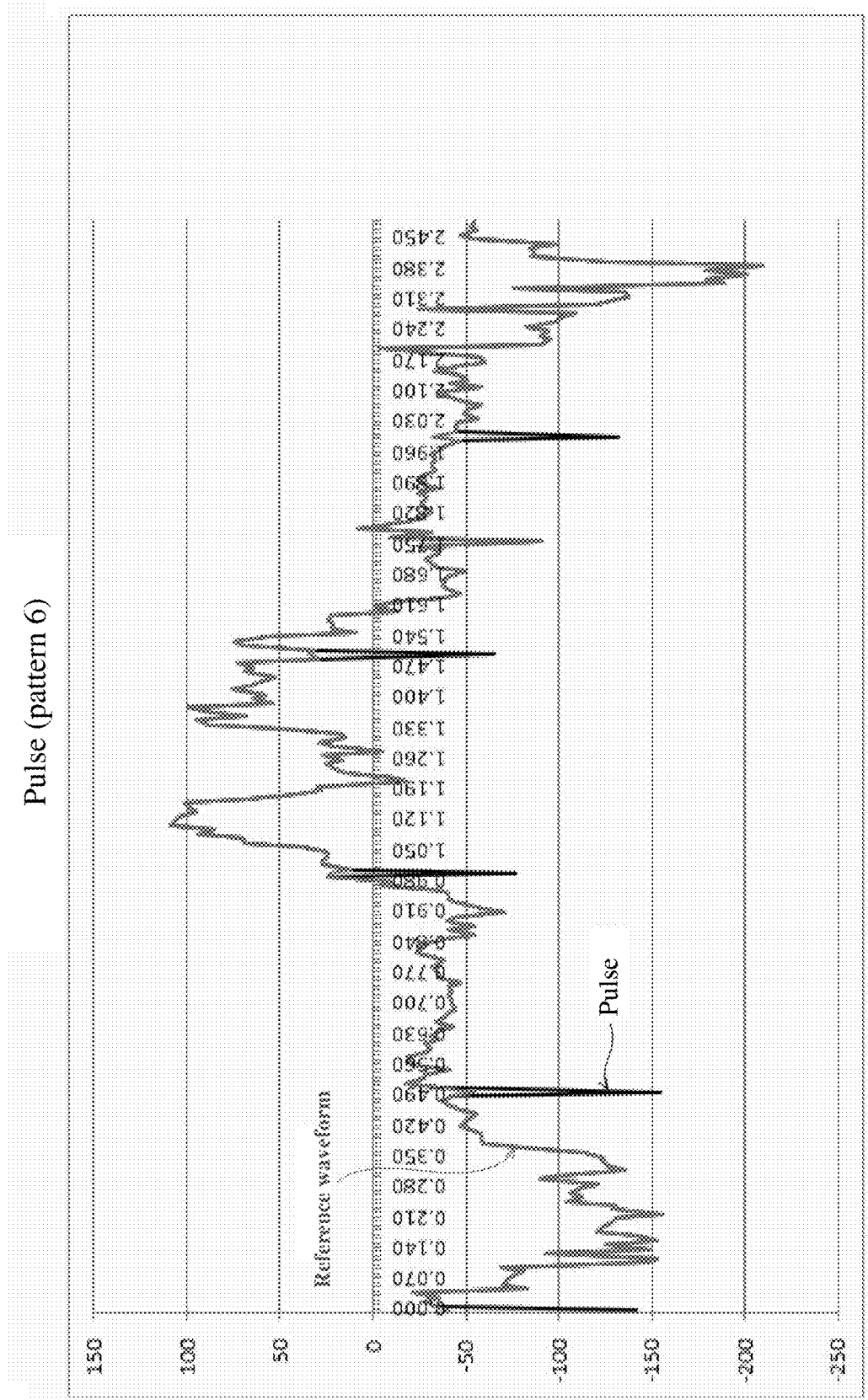
[FIG. 15]

[FIG. 16]

| Alarm or warning item | | | Oscillation (pattern 5) | Pulse (pattern 6) | Failure position |
|---|---|---|---|---|---|
| Motor position deviation | Mean square value | Median | | ○ | Wear of inside-device harness or motor uvw (large resistance) |
| | | Standard deviation | | | Instantaneous disconnection in inside-device harness or motor UVW |
| | Peak | Median | ○ | | |
| | | Standard deviation | | ○ | Instantaneous disconnection in inside-device harness or motor UVW |

METHOD FOR ESTIMATING POSITION WHERE ABNORMALITY HAS OCCURRED, AND PROGRAM FOR ESTIMATING POSITION WHERE ABNORMALITY HAS OCCURRED

TECHNICAL FIELD

The present invention relates to a method for estimating a position where an abnormality has occurred in a robot and a program for estimating a position where the abnormality has occurred.

BACKGROUND ART

PTL 1 discloses a conventional technique of monitoring a value of a current flowing through a servo motor and a deviation amount of the servo motor in order to detect an abnormality due to deterioration over time in a robot. PTL 1 discloses that the value of the current flowing through the servo motor and the deviation amount of the servo motor are used as deterioration indication parameters, and that when these deterioration indication parameters exceed a threshold, a device is stopped and an alarm is issued.

CITATION LIST

Patent Literature

PTL 1: WO 2016/103310 A

SUMMARY OF INVENTION

Technical Problem

The device disclosed in PTL 1 can prompt maintenance when the device needs to be maintained due to deterioration over time or an abnormality. Accordingly, an appropriate timing for maintenance can be notified.

However, since a position where the abnormality has occurred remains unknown, which position should be maintained is unknown. It is thus not known which portion should be maintained by a replacement of parts or the like, and there has been trouble of locating the position to be maintained.

In view of the above circumstances, an object of the present invention is to provide a method for estimating a position where an abnormality has occurred and a program for estimating a position where the abnormality has occurred.

Solution to Problem

According to the present invention, a method for estimating a position where an abnormality has occurred is a method for estimating a position where an abnormality has occurred in a robot that drives an arm using a servo motor, the method including an abnormality detection step of detecting that an abnormality has occurred, and a position detection step of detecting, when occurrence of the abnormality is detected in the abnormality detection step, a position the abnormality has occurred.

In the method for estimating a position where an abnormality has occurred with the above configuration, the position where the abnormality has occurred is detected in the position detection step. This saves trouble of locating the position where the abnormality has occurred.

Further, the method for estimating a position where an abnormality has occurred may include a cycle observed value detection step of observing a transition of a value of a current flowing through the servo motor or a position deviation of the servo motor as an observed value, and detecting a representative value of the observed value for each cycle in a prescribed operation of an operation for each cycle in an operation repeatedly performed by the robot, and a daily observed value detection step of detecting a representative value of the observed value for each day from the representative value of the observed value detected for each cycle.

The representative value of the observed value for each day is detected, and thus a tendency of the observed value based on a change in the representative value of the observed value for each day can be acquired.

In the abnormality detection step, when the representative value of the observed value for each day deviates from a prescribed range, occurrence of an abnormality may be detected.

The occurrence of an abnormality is detected when the representative value of the observed value for each day deviates from the prescribed range. Thus, when an abnormality occurs, the occurrence of the abnormality can be accurately detected from the change in the representative value of the observed value for each day.

In addition, the position detection step may include an estimation step of estimating a position where an abnormality has occurred from a type of value deviating from the prescribed range of the representative value of the observed value for each day detected for a plurality of types, and a waveform of the observed value when the occurrence of the abnormality is detected in the abnormality detection step.

The position where an abnormality has occurred is estimated from the type of the value deviating from the prescribed range and the waveform of the current flowing through the servo motor, and thus the position where the abnormality has occurred can be accurately specified.

Further, the position where the abnormality has occurred may be organized on a table in advance in accordance with the type of value deviating from the prescribed range and the waveform of the observed value when the occurrence of the abnormality is detected in the abnormality detection step, and the position where the abnormality has occurred may be estimated by referring to the table in the estimation step.

On the basis of the table created in advance, and by referring to the table, the position where the abnormality has occurred is estimated, and thus the position where the abnormality has occurred can be easily estimated.

In the cycle observed value detection step, a mean square value and a peak value of the observed value in the prescribed operation may be calculated for each cycle, and the daily observed value detection step may include: a mean square median calculation step of calculating a median of the mean square value for each day; a mean square standard deviation calculation step of calculating a standard deviation of the mean square value for each day; a peak median calculation step of calculating a median of the peak value for each day; and a peak standard deviation calculation step of calculating a standard deviation of the peak value for each day.

The mean square value and peak value for each cycle are calculated in the cycle observed value detection step, and the median and the standard deviation of the mean square value for each day, and the median and the standard deviation of the peak value for each day are calculated for each day in the daily observed value detection step. The values of the mean square value and the peak value for each day can be therefore accurately acquired.

Further, the occurrence of the abnormality may be detected in the abnormality detection step, when any one of the values deviates from a prescribed range, the values being the median of the mean square value calculated in the mean square median calculation step, the standard deviation of the mean square value calculated in the mean square standard deviation calculation step, the median of the peak value calculated in the peak median calculation step, and the standard deviation of the peak value calculated in the peak standard deviation calculation step.

The occurrence of the abnormality is detected when any one of the values deviates from the prescribed range, and thus timing when the abnormality occurs can be detected more accurately.

The estimation step may include a selection step of selecting which pattern among a plurality of preset patterns the waveform of the observed value at detection of the occurrence of the abnormality in the abnormality detection step is applicable to.

Which pattern the waveform of the observed value is applicable to is selected from the plurality of preset patterns, and thus the pattern can be easily selected.

Further, the observed value may be a value of a current flowing through the servo motor, in the selection step, pattern 1 is defined when the waveform of the current flowing through the servo motor at detection of the occurrence of the abnormality in the abnormality detection step is enlarged similarly to a reference waveform of the current flowing through the servo motor without the occurrence of the abnormality, and an enlargement ratio is equal to or less than a threshold, pattern 2 is defined when the enlargement ratio is greater than the threshold, pattern 3 is defined when there is a frequency at which a component of the waveform of the current flowing through the servo motor is larger than the reference waveform by a certain amount or more, and the frequency is within a prescribed frequency range, and pattern 4 is defined when the frequency is not within the prescribed frequency range, and the selection step may include a current value pattern selection step of selecting which one of patterns 1 to 4 the waveform of the current flowing through the servo motor at detection of the occurrence of the abnormality is applicable to.

When the observed value is the value of the current flowing through the servo motor, which of patterns 1 to 4 the waveform of the current flowing through the servo motor is applicable to is selected in the selection step. Thus, the selection step can be easily performed.

Further, the observed value may be a position deviation of the servo motor, in the selection step, pattern 5 is defined when there is a frequency at which a component of the waveform of the position deviation of the servo motor at detection of the occurrence of the abnormality in the abnormality detection step is larger than a reference waveform of the position deviation of the servo motor without the occurrence of the abnormality by a certain amount or more, and the frequency is within a prescribed frequency range, and pattern 6 is defined when the frequency is not within the prescribed frequency range, and the selection step may include a position deviation pattern selection step of selecting which one of patterns 5 and 6 the waveform of the position deviation of the servo motor at detection of the occurrence of the abnormality in the abnormality detection step is applicable to.

When the observed value is the position deviation of the servo motor, which of pattern 5 or 6 the waveform of the position deviation of the servo motor is applicable to is selected in the selection step. Thus, the selection step can be easily performed.

Further, according to the present invention, a program for estimating a position where an abnormality has occurred is a program for estimating a position where an abnormality has occurred in a robot that drives an arm using a servo motor, the program causing a computer to execute: an abnormality detection step of detecting that an abnormality has occurred; and a position detection step of detecting, when occurrence of the abnormality is detected in the abnormality detection step, a position where the abnormality has occurred.

In the program for estimating a position where an abnormality has occurred with the above configuration, the position where the abnormality has occurred is detected in the position detection step. This saves trouble of locating the position where the abnormality has occurred.

Advantageous Effects of Invention

In the present invention, a position where an abnormality has occurred can be detected, and thus a position to be maintained by replacement of parts or the like can be detected. This saves trouble of locating the position to be maintained.

BRIEF DESCRIPTION OF DRAWINGS

FIG. 1 is a configuration diagram schematically showing a robot in which a position where an abnormality has occurred is detected by a method for estimating a position where an abnormality has occurred according to an embodiment of the present invention.

FIG. 2 is a block diagram showing a configuration of a control system in the robot of FIG. 1.

FIG. 3 is a flowchart of processing when the position where the abnormality has occurred is detected by the method for estimating a position where an abnormality has occurred in the robot of FIG. 1.

FIG. 4 is a flowchart showing in more detail an abnormality detection step in the processing of FIG. 3.

FIG. 5 is a flowchart showing in more detail processing when a median and a standard deviation of a mean square value are confirmed in processing of FIG. 4.

FIG. 6 is a flowchart showing in more detail processing when a median and a standard deviation of a peak value are confirmed in the processing of FIG. 4.

FIG. 7 is a flowchart showing in more detail a position detection step in the processing of FIG. 3.

FIG. 8 is a flowchart showing in more detail processing when a target waveform is subjected to an FFT analysis in processing of FIG. 7.

FIG. 9 is a graph showing a reference waveform of a current value and a waveform of the current value enlarged similarly to the reference waveform and an enlargement ratio is 110%.

FIG. 10 is a graph showing the reference waveform of a current value and a waveform of the current value enlarged similarly to the reference waveform and the enlargement ratio is 200%.

FIG. 11 is a graph showing the reference waveform of a current value and a waveform of the current value when an oscillation tendency is observed with respect to the reference waveform.

FIG. 12 is a graph showing the reference waveform of a current value and a waveform of the current value when a pulse is observed with respect to the reference waveform.

FIG. 13 is a table prepared in relation to a position where an abnormality has occurred in accordance with an item for which an alarm or warning for the current flowing through the servo motor is issued and a waveform pattern of the current flowing through the servo motor at detection of the abnormality.

FIG. 14 is a graph showing a reference waveform of a position deviation of the servo motor and a waveform of the position deviation when an oscillation tendency is observed with respect to the reference waveform.

FIG. 15 is a graph showing the reference waveform of a position deviation of the servo motor and a waveform of the position deviation when a pulse is observed with respect to the reference waveform.

FIG. 16 is a table prepared in relation to a position where an abnormality has occurred in accordance with an item for which an alarm or warning for the position deviation of the servo motor is issued and a waveform pattern of the position deviation of the servo motor at detection of the abnormality.

DESCRIPTION OF EMBODIMENTS

Hereinafter, a method for estimating a position where an abnormality has occurred according to an embodiment of the present invention will be described with reference to the accompanying drawings.

FIG. 1 is a configuration diagram of a robot according to an embodiment of the present invention. FIG. 2 is a block diagram of a configuration of a control system in the robot 100.

The robot 100 of this embodiment has a control unit 14. The control unit 14 controls an operation of the robot 100. The control unit 14 accommodates therein a control board that controls the operation of the robot 100. In this embodiment, the robot 100 is used as a multi-axis industrial robot. The robot 100 used in this embodiment includes a robot arm.

As shown in FIG. 2, the control unit 14 of the robot 100 includes a calculation unit 14a, a storage unit 14b, and a servo control unit 14c.

The control unit 14 is a robot controller including a computer such as a microcontroller. The control unit 14 may be configured by a single control unit 14 that performs centralized control, or may be configured by a plurality of control units 14 that performs distributed control in cooperation with one another.

The storage unit 14b stores information such as a basic program as a robot controller and various fixed data. The calculation unit 14a controls various operations of the robot 100 by reading and executing software such as the basic program stored in the storage unit 14b. That is, the calculation unit 14a generates a control command for the robot 100 and outputs this control command to the servo control unit 14c. For example, the calculation unit 14a is configured by a processor unit.

The servo control unit 14c is configured to control a drive of a servo motor corresponding to each joint of the robot arm of the robot 100 in response to the control command generated by the calculation unit 14a.

Further, the robot 100 includes a current value acquisition device 15 that acquires a value of a current flowing through the servo motor during a prescribed period. The current value acquisition device 15 can acquire the value of the current flowing through the servo motor.

In this embodiment, a controller 50 is connected to the control unit 14. The current value acquisition device 15 is connected to the control unit 14 and the controller 50, and the control unit 14 and the controller 50 are connected via the current value acquisition device 15.

The controller 50 includes a storage unit 17 and a calculation unit 18. The controller 50 is configured by, for example, a personal computer (PC). The controller 50 performs a calculation in the calculation unit 18 with reference to data stored in the storage unit 17 on the basis of the value of the current flowing through the servo motor acquired by the current value acquisition device 15. The controller 50 can thus detect whether an abnormality has occurred in the robot 100. For example, the calculation unit 18 is configured by a processor unit. The storage unit 17 in the controller 50 stores in advance a table and the like to be described later. At the same time, the controller 50 can perform processing of estimating and detecting a position where an abnormality has occurred in the robot 100. As described above, the controller 50 can detect whether an abnormality has occurred in the robot 100 on the basis of the current value acquired by the current value acquisition device 15 and can also detect a position where the abnormality has occurred.

Next, a method for estimating a position where an abnormality has occurred in this embodiment will be described.

Long-term repeated work for a prescribed cycle using the robot 100 will deteriorate the robot 100 over time. The deterioration in the robot 100 over time, for example, increases a resistance generated between parts configuring the robot 100 when the parts slide with each other. Thus, in such a case, members cannot move by the same amount as before the deterioration for the robot to do the same operation without a larger amount of current supplied to the servo motor. In this way, when an abnormality occurs in any position of the parts configuring the robot 100 due to deterioration over time, the current flowing through the servo motor changes as compared to before the deterioration occurs.

When an abnormality occurs due to deterioration over time, a change in a waveform of the current or a change in a position deviation of the servo motor varies depending on a deteriorated position. Accordingly, by detecting the change in the waveform of the current flowing through the servo motor and the change in the waveform of the position deviation of the servo motor when the robot 100 is driven, a position where an abnormality has occurred due to deterioration over time can be estimated. Hereinafter, the value of the current flowing through the servo motor or the position deviation of the servo motor at which a transition is observed for estimating the position where an abnormality has occurred is referred to as an observed value.

FIG. 3 shows a flowchart of the method for estimating a position where an abnormality has occurred in this embodiment.

First, a method for estimating a position where an abnormality has occurred by using the current flowing through the servo motor among the observed values observed for estimating a position where an abnormality has occurred will be described.

As shown in FIG. 3, first, it is detected whether an abnormality has occurred from the current flowing through the servo motor of the robot 100 (S101). When occurrence of an abnormality in the robot 100 is detected in an abnormality detection step of S101 (S102), a position detection step of detecting a position where the abnormality has occurred is performed (S103). In this embodiment, the computer of the controller 50 or the control unit 14 performs the abnormality detection step and the position detection step in accordance with the program.

Next, the abnormality detection step will be described. FIG. 4 is a flowchart of the abnormality detection step. In the abnormality detection step, first, a waveform of a current flowing through the servo motor is acquired for a prescribed operation for one cycle. Here, the current value acquisition device 15 acquires a current value flowing through the servo motor that changes with the passage of time, and as a result, acquires a waveform of the current flowing through the servo motor (S201).

The prescribed operation for one cycle for which the waveform of the current flowing through the servo motor is acquired may be only a part of the steps of one cycle of the work repeatedly performed by the robot 100. Alternatively, the prescribed operation may be a step over the entire one cycle of the work repeatedly performed by the robot 100.

When the waveform of the current for one cycle is acquired, a mean square value of the waveform of the current is calculated on the basis of the acquired waveform (S202). The mean square value is calculated as a representative value of the current value for one cycle.

In this embodiment, when the mean square value is calculated, sampling is performed for 30 seconds per cycle. At this time, sampling is performed at a sampling period of 2 (msec). In this embodiment, tallying is performed for 200 cycles per day. Therefore, in this embodiment, the mean square value for 200 cycles is calculated per day.

When the mean square value for the waveform of the current for one cycle is calculated, the threshold for the mean square value of the current value for one cycle is referred to, and it is detected whether the mean square value of the current flowing through the servo motor for one cycle exceeds the threshold (S204). When the mean square value exceeds the threshold, an alarm is issued at that point (S205). When the mean square value does not exceed the threshold, the processing proceeds.

Next, a peak value of an absolute value of the current is detected from the waveform of the current. For the detection of the peak value of the waveform of the current, the waveform of the current for one cycle is acquired, and the peak value of the waveform of the current is calculated on the basis of the acquired waveform. The peak value is calculated as a representative value of the current value for one cycle.

In this embodiment, when the peak value is calculated, sampling is performed for 30 seconds per cycle, similarly to the calculation of the mean square value. At this time, sampling is performed at a sampling period of 2 (msec). In this embodiment, tallying is performed for 200 cycles per day. Therefore, the peak value for 200 cycles is calculated per day in this embodiment.

The peak value of the absolute value of the current flowing through the servo motor for one cycle is detected, and then the peak value is compared with a threshold for the peak value (S206).

When the peak value exceeds the threshold (S207), an alarm is issued at that point (S208). When the peak value does not exceed the threshold, the processing proceeds.

As described above, the value of the current flowing through the servo motor is detected in a prescribed operation of an operation for each cycle of an operation repeatedly performed by the robot (cycle observed value detection step). Here, the mean square value and the peak value of the value of the current flowing through the servo motor are calculated by the prescribed operation for each cycle. That is, in the cycle observed value detection step in this embodiment, the mean square value and the peak value of the current flowing through the servo motor in the prescribed operation are calculated for each cycle.

One mean square value and one peak value are calculated for one cycle, and these values are stored as representative values for each cycle.

When the mean square value and the peak value of the current for one cycle are compared with the threshold, it is detected whether a certain period has elapsed since the device was started. In a case where a certain period has not elapsed since the device was started, the mean square value and the peak value of the current for one cycle are unstable in this period. There is no problem even when the mean square value and the peak value exceed the threshold. The processing thus returns and repeats itself until a certain period elapses.

In a case where a certain period has elapsed, and the mean square value or the peak value exceeds the threshold and an alarm is issued, it is determined that an abnormality has occurred due to deterioration over time or the like. It is therefore detected here whether an alarm has been issued (S210).

In a case where an alarm is issued, and the mean square value or the peak value exceeds the threshold, it is estimated that an abnormality has occurred, and the processing proceeds to the position detection step. In a case where an alarm is not issued in S210, the processing proceeds to confirmation of a median and a standard deviation of the data on the current for each day.

Next, the confirmation of the median and the standard deviation of the data on the mean square value of the current for each day will be described.

FIG. 5 is a flowchart of processing when the median and the standard deviation of the data on the mean square value for the current for each day.

The mean square value of the value of the current flowing through the servo motor for each cycle in the prescribed operation has already been acquired. When the data on the mean square value for each cycle is acquired for one day, the median and the standard deviation of the data for one day can be acquired. Therefore, the mean square value for each cycle is totaled over one day, and the median and the standard deviation of the mean square value are calculated for each day (S301). The median and the standard deviation of the mean square value are calculated as the representative values of the current value for each day. As described above, the representative value of the current value for each day is detected from the representative value of the current value detected for each cycle (daily observed value detection step). Here, the median and the standard deviation of the mean square value are calculated for each day.

The median and the standard deviation of the mean square value are calculated for each day and plotted for each day, whereby the median and standard deviation can be represented in a graph. Thus, by drawing an extension of the data on the median and the standard deviation on the graph, a daily change in the median and the standard deviation is predicted using an approximate curve (S302). This makes it possible to read a daily trend of the mean square value of the current value.

The resistance usually increases in the device due to deterioration over time. Thus, even when a prescribed command value is input to the servo motor, the current value to be input tends to increase because of an increasing resistance of the servo motor. Therefore, the value of the current flowing through the servo motor usually tends to increase day by day.

An approximate curve for the current value at this time is created and the daily change in the median and the standard deviation is predicted. This makes it possible to predict a day on which the median and the standard deviation exceed the threshold (S303). It is therefore possible to predict how many days from the present time the median and the standard deviation will exceed the threshold. When the day on which the median and the standard deviation exceed the threshold comes within a set period, the day on which the median and the standard deviation exceed the threshold is approaching, and thus a warning is issued at that point. As described above, it is detected whether the day on which the median and the standard deviation exceed the threshold is within the prescribed period (S304). When the median and the standard deviation reach the threshold, a warning may be issued at that point.

When a day on which the median and the standard deviation exceed the threshold is within the set period, a warning is issued (S305). In this way, when the current value (median and standard deviation) for each day deviates from a prescribed range, it is detected that an abnormality due to deterioration over time has occurred. Here, when it is detected that the day on which the current value (median and standard deviation) for each day exceeds the threshold is within the prescribed period set in advance, it is determined that the current value for each day also deviates from the prescribed range and that an abnormality due to deterioration over time has occurred. When the median and the standard deviation do not exceed the threshold (when the median and the standard deviation is not within the prescribed period set in advance), the processing proceeds without a warning being issued. Then, the confirmation of the median and the standard deviation of the data on the mean square value of the current for each day ends.

The median and the standard deviation of the mean square value for data measured numerous times a day (200 times in this embodiment) can be expressed as data as the representative value. Thus, the number of data pieces to be stored can be significantly reduced, and for example, a capacity of the storage unit 17 in the controller 50 can be reduced.

Next, confirmation of a median and a standard deviation of data on the peak value of the current for each day will be described.

FIG. 6 is a flowchart of processing when the median and the standard deviation of the data on the peak value of the current for each day are confirmed. The peak value of the value of the current flowing through the servo motor for each cycle in the prescribed operation has already been acquired. When the data on the peak value for each cycle for one day is acquired, the median and the standard deviation of the data for one day can be acquired. Therefore, the peak value for each cycle is totaled over one day, and the median and the standard deviation of the peak value are calculated for each day (S401). The median and the standard deviation of the peak value are calculated as the representative values of the current value for each day.

When the median and the standard deviation of the peak value are calculated for each day, the median and the standard deviation can be represented in a graph. Therefore, by drawing an extension of the data on the median and the standard deviation on the graph, a daily change in the median and the standard deviation is predicted using an approximate curve (S402). This makes it possible to read a daily trend of the peak value of the current value.

Further, by predicting the daily change in the median and the standard deviation using the approximate curve, it is possible to predict a day on which the median and the standard deviation exceed the threshold (S403). Therefore, it is possible to predict how many days from the present time the median and the standard deviation will be exceeded the threshold. When the day on which the median and the standard deviation exceed the threshold comes within a set period, the day on which the median and the standard deviation exceed the threshold is approaching, and thus a warning is issued at that point. As described above, it is detected whether the day on which the median and the standard deviation exceed the threshold is within the prescribed period (S404). When the median and the standard deviation reach the threshold, a warning may be issued at that point.

When a day on which the median and the standard deviation exceed the threshold is within the set period, a warning is issued (S405). In this way, when the daily current value (median and standard deviation) of the peak value deviates from the prescribed range, it is detected that an abnormality due to deterioration over time has occurred. Here, when it is detected that the day on which the current value (median and standard deviation) for each day exceeds the threshold is within the prescribed period set in advance, it is determined that the current value for each day also deviates from the prescribed range and that an abnormality due to deterioration over time has occurred. When the median and the standard deviation do not exceed the threshold (when the median and the standard deviation is not within the prescribed period set in advance), the processing proceeds without a warning being issued. Then, the confirmation of the median and the standard deviation of the data on the peak value of the current for each day ends.

Similarly, for the peak value, the median and the standard deviation of the peak value for data measured numerous times a day (200 times in this embodiment) can be expressed as data as the representative value. Thus, the number of data pieces to be stored can be significantly reduced, and the capacity of the storage unit 17 in the controller 50 can be reduced.

As described above, in the daily observed value detection step in this embodiment, the median of the mean square value is calculated for each day (mean square value calculation step). Further, the standard deviation of the mean square value is calculated for each day (mean square standard deviation calculation step). The median of the peak value is calculated for each day (peak median calculation step). The standard deviation of the peak value is calculated for each day (peak standard deviation calculation step). Then, when any calculated value of the median of the mean square value, the standard deviation of the mean square value, the median of the peak value, and the standard deviation of the peak value deviates from the prescribed range, it is detected that an abnormality has occurred.

When the median and the standard deviation of the data on the peak value of the current for each day are confirmed, the abnormality detection step ends. When an alarm or warning is issued in the abnormality detection step, it is determined that there is an abnormality, and a part having the abnormality is detected in the position detection step.

Next, the position detection step will be described. In the position detection step, it is detected which pattern a waveform of the current flowing through the servo motor at detection of the abnormality in the abnormality detection step is classified into.

FIG. 7 is a flowchart showing the processing of the position detection step. In the position detection step, it is detected how the waveform of the current flowing through the servo motor at detection of the abnormality in the abnormality detection step has changed from a reference waveform before the occurrence of the abnormality.

First, it is detected whether the waveform of the current flowing through the servo motor at detection of the abnormality is enlarged similarly to the reference waveform.

First, the reference waveform is enlarged (S501). When the reference waveform is enlarged, the enlarged reference waveform is compared with the waveform of the current flowing through the servo motor at detection of the abnormality. Here, a correlation value between the enlarged reference waveform and the acquired target waveform is calculated (S502).

When the correlation value between the enlarged reference waveform and the waveform of the current flowing through the servo motor at detection of the abnormality is calculated, whether the correlation value is within 5% or less of a reference value is detected (S503).

It is considered that the higher the correlation value is, the more precisely the enlarged reference waveform and the waveform of the current flowing through the servo motor match. When the correlation value is within a difference of 5% or less from the preset reference value, it is determined that the enlarged reference waveform and the acquired target waveform substantially match. Therefore, it is determined that the waveform of the current flowing through the servo motor at detection of the abnormality is enlarged similarly to the reference waveform. Therefore, it is detected whether an enlargement ratio at that time is 110% or less (S504).

When the waveform of the current flowing through the servo motor at detection of the abnormality is enlarged similarly to the reference waveform, and the enlargement ratio is 110% or less, it is estimated that the waveform is enlarged similarly and the enlargement ratio is small. Therefore, in this case, the waveform of the current flowing through the servo motor at detection of the abnormality is classified into pattern 1. As described above, defined as pattern 1 is a case where the waveform of the current flowing through the servo motor at detection of occurrence of an abnormality is enlarged similarly to the reference waveform of the current flowing through the servo motor without occurrence of an abnormality, and the enlargement ratio is equal to or less than the threshold.

When the waveform of the current flowing through the servo motor at detection of the abnormality is enlarged similarly to the reference waveform, and the enlargement ratio is greater than 110%, it is estimated that the waveform is enlarged similarly and the enlargement ratio is large. Therefore, in this case, the waveform of the current flowing through the servo motor at detection of the abnormality is classified into pattern 2. As described above, defined as pattern 2 is a case where the waveform of the current flowing through the servo motor at detection of occurrence of an abnormality is enlarged similarly to the reference waveform of the current flowing through the servo motor without occurrence of an abnormality, and the enlargement ratio is greater than the threshold.

When the correlation value is not within a difference of 5% or less from the reference value in S503, it is determined that the enlarged reference waveform does not match the acquired target waveform. In this case, it is detected whether the correlation value between the enlarged reference waveform and the acquired target waveform is larger than the previous value (S505).

When the correlation value is equal to or less than the previous value, it is determined that the enlarged reference waveform is close to the target waveform. The enlargement ratio of the reference waveform is thereby further increased (S506). Then, the correlation between the enlarged reference waveform and the acquired target waveform is confirmed again.

When the correlation value between the enlarged reference waveform and the acquired target waveform is larger than the previous value in S505, the acquired target waveform is not close to the waveform of the current flowing through the servo motor with the enlargement ratio of the enlarged reference waveform being changed. It is determined that the correlation between the reference waveform and the waveform of the current flowing through the servo motor is small. Even with the enlargement ratio being changed, the difference between the enlarged reference waveform and the acquired target waveform is increasing. Thus, it is determined that the acquired target waveform is not enlarged similarly to the reference waveform. As a result, in such a case, the target waveform is subjected to an FFT analysis (S507).

An analysis for each frequency of the target waveform subjected to the FFT analysis will be described with reference to a flowchart in FIG. 8.

The target waveform is subjected to the FFT analysis, and the waveform is analyzed for each frequency (S601).

It is detected whether an intensity of a specific frequency band is 1.5 times or more the intensity (power spectrum) of other frequency bands (S602). When it is detected whether the intensity of the specific frequency band is 1.5 times or more the intensity of other frequency bands, it is detected whether there is a frequency band that is 1.5 times or more the intensity of the other frequency bands, and whether the frequency band is within the specific frequency band.

When there is a frequency band having an intensity that is 1.5 times or more the intensity of the other frequency bands, and the frequency band is within a range of a prescribed frequency band, it is determined that the intensity of the specific frequency band is 1.5 times or more the intensity of the other frequency bands. When the intensity of the specific frequency band is 1.5 times or more the intensity of the other frequency bands, it is determined that the waveform has an oscillation tendency. Therefore, in this case, the waveform of the current flowing through the servo motor at detection of the abnormality is classified into pattern 3. In this way, defined as pattern 3 is a case where the waveform of the current flowing through the servo motor at detection of occurrence of the abnormality is Fourier-transformed, a frequency at which a component of the waveform of the current flowing through the servo motor is larger than the reference waveform by a certain amount or more is present, and the frequency is within the range of the prescribed frequency. Here, a waveform having an oscillation tendency refers to a waveform in which noise is observed over a certain frequency.

In a waveform having an oscillation tendency, a noise-like portion different from a normal waveform is usually observed in a high frequency region. The specific frequency is often in a high frequency region. In this embodiment, when a waveform has a frequency band having an intensity 1.5 times or more of the intensity of the other frequency bands in a higher frequency region than a frequency region of a robot or a reduction gear, the waveform has an oscillation tendency and is classified into pattern 3.

When the intensity of the specific frequency band is not 1.5 times or more the intensity of the other frequency bands, it is detected whether the intensity of the specific frequency is 1.5 times or more the intensity of the other frequency bands (S603). That is, it is detected whether there is a portion where the intensity is 1.5 times or more the intensity of other frequency components only in a narrow range of frequency components.

When there is a frequency component having an intensity of 1.5 times or more the intensity of the other frequency bands only in the narrow range of frequency components in S603, it is determined that the waveform has a pulse that protrudes only in the narrow range of frequency components. As described above, when there is a frequency component having an intensity of 1.5 times or more the intensity of the other frequency bands, and the frequency is not within a region of the specific frequency band, it is determined that the waveform has a pulse that largely protrudes only in the narrow range of frequency components. Therefore, in this case, the waveform of the current flowing through the servo motor at detection of the abnormality is classified into pattern 4. As described above, defined as pattern 4 is a case where the waveform of the current flowing through the servo motor at detection of the abnormality is Fourier-transformed, there is a frequency at which the component of the waveform of the current flowing through the servo motor is larger than the reference waveform by a certain amount or more, and the frequency is not within a prescribed frequency range. The waveform having a pulse described here refers to a waveform in which a portion locally deviating from a certain level is observed.

When there is no frequency component having an intensity of 1.5 times or more the intensity of the other frequency bands only in the narrow range of a specific frequency component in S603, it is determined that an abnormality part cannot be detected. Therefore, the abnormality part is detected by another method.

In this embodiment, it is detected whether the intensity of the specific frequency band is 1.5 times or more the intensity (power spectrum) of the other frequency bands in S602. However, the present invention is not limited thereto. It may be detected whether the intensity (power spectrum) of the specific frequency band of the target waveform is, over the entire waveform, 1.5 times or more the intensity (power spectrum) of the same frequency band of the reference waveform.

Next, the waveform of each pattern when an abnormality occurs will be described.

FIG. 9 shows a waveform when the waveform of the current flowing through the servo motor is enlarged similarly to the reference waveform, and the enlargement ratio is 110% (pattern 1). FIG. 10 shows a waveform when the waveform of the current flowing through the servo motor is enlarged similarly to the reference waveform, and the enlargement ratio is 200% (pattern 2). FIG. 11 shows a waveform when the waveform of the current flowing through the servo motor has an oscillation tendency (pattern 3). FIG. 12 shows a waveform when a pulse component occurs in the waveform of the current flowing through the servo motor (pattern 4).

When the waveform of the current flowing through the servo motor at detection of the abnormality applies to any one of the four patterns, which pattern the waveform fits is detected and the fit pattern is stored. Then, the position where the abnormality has occurred is estimated from an item for which an alarm or warning is issued in the abnormality detection step and a waveform pattern of the current flowing through the servo motor at detection of the abnormality.

In this embodiment, a table related to a position where an abnormality has occurred is created in advance. This table indicates an estimated position where an abnormality has occurred in accordance with an item for which an alarm or warning has been issued and the waveform pattern of the current flowing through the servo motor at detection of the abnormality. Therefore, by referring to the table, it is possible to estimate a position where the abnormality has occurred from the item for which an alarm or warning is issued and the waveform pattern of the current flowing through the servo motor at detection of the abnormality. As described above, a type of value deviating from the prescribed range among the daily current values detected for a plurality of types of values, and the waveform of the current flowing through the servo motor at detection of occurrence of an abnormality, the position where the abnormality has occurred is estimated (estimation step). In this embodiment, it is selected which one of a plurality of preset patterns of the waveform of the current flowing through the servo motor at detection of occurrence of an abnormality is applicable to (selection step). Specifically, it is selected which one of patterns 1 to 4 the waveform of the current flowing through the servo motor at detection of occurrence of an abnormality is applicable to (current value pattern selection step).

FIG. 13 shows a table created in advance in relation to a position where an abnormality has occurred.

As shown in FIG. 13, when the median of the mean square value exceeds the threshold, an alarm or warning is issued at that point, the waveform of the current flowing through the servo motor at that time is enlarged similarly, and the enlargement ratio is small (pattern 1), the reduction gear is estimated to have failed.

When the median of the mean square value exceeds the threshold, an alarm or warning is issued at that point, the waveform of the current flowing through the servo motor at that time is enlarged similarly, and the enlargement ratio is large (pattern 2), it is estimated that an abnormality has occurred in a harness used in the robot. Here, it is estimated that in particular, wiring connected to a motor brake (motor brake line) suffers from wear, thereby increasing the resistance.

Further, when the median of the mean square value exceeds the threshold, an alarm or warning is issued at that point, the waveform of the current flowing through the servo motor at that time is a waveform having an oscillation tendency (pattern 3), it is estimated that a lost motion (backlash) increases mainly in the reduction gear due to deterioration over time.

When the standard deviation of the mean square value exceeds the threshold, an alarm or warning is issued at that point, the waveform of the current flowing through the servo motor at that time is a waveform having an oscillation tendency (pattern 3), the reduction gear is estimated to have failed.

When the median of the peak value exceeds the threshold, an alarm or warning is issued at that point, the waveform of the current flowing through the servo motor at that time is enlarged similarly, and the enlargement ratio is small (pattern 1), the reduction gear is estimated to have failed.

When the median of the peak value exceeds the threshold, an alarm or warning is issued at that point, the waveform of the current flowing through the servo motor at that time is enlarged similarly, and the enlargement ratio is large (pattern 2), it is estimated that an abnormality has occurred in the harness used in the robot. Here, it is estimated that in particular, the harness connected to the motor brake suffers from wear, thereby increasing the resistance.

When the standard deviation of the peak value exceeds the threshold, an alarm or warning is issued at that point, and the current flowing through the servo motor at that time has a waveform having an oscillation tendency (pattern 3), the reduction gear is estimated to have failed.

When the standard deviation of the peak value exceeds the threshold, an alarm or warning is issued at that point, and the current flowing through the servo motor at that time is a waveform having a pulse (pattern 4), three cases of abnormality are considered. In the first case, it is estimated that an abnormality has occurred in the harness used in the robot. In particular, it is estimated that an instantaneous short circuit or ground fault has occurred in the harness connected to a power line of a three-phase motor (line of three-phase motor). In the second case, it is estimated that an abnormality has occurred in the harness used in the robot, and in particular, it is estimated that an instantaneous disconnection has occurred in the harness connected to the motor brake (motor brake line). In the third case, it is estimated that an abnormality has occurred in the servo motor. Specifically, it is considered that an internal magnet is damaged in the servo motor.

In this way, the position where an abnormality has occurred is organized on a table in accordance with the type of the value deviating from the prescribed range and the waveform of the current flowing through the servo motor at detection of occurrence of the abnormality. Then, by referring to the table, the position where the abnormality has occurred is estimated.

In this embodiment, a position where the abnormality has occurred is empirically related to the item of the type of the value deviating from the prescribed range and the waveform of the current flowing through the servo motor at detection of occurrence of an abnormality.

As described above, a table of a relationship between the median and the standard deviation of the mean square value and the median and the standard deviation of the peak value of the current flowing through the servo motor, and the waveform of the current flowing through the servo motor at detection of an abnormality is referred to. Then, the position where the abnormality has occurred is estimated. When occurrence of an abnormality is detected, the position where the abnormality has occurred is estimated on the basis of the table created in advance. Thus, the position where the abnormality is estimated to have occurred can be notified. The position where the abnormality has occurred is estimated, and the position where the abnormality has occurred is notified. The device can be therefore maintained by, for example, a replacement of a part in the notified position. This eliminates the need for locating the position where the abnormality has occurred, and saves trouble of locating the position.

This saves trouble of locating a position where an abnormality has occurred, and the device can be easily handled during maintenance or the like. Therefore, a user-friendly device can be provided.

Further, time for maintenance can be reduced, and the time during which the work cannot be performed because of maintenance can be reduced. Therefore, the work can be performed more efficiently, and operating costs can be reduced.

In the above embodiment, the mean square value and the peak value of the value of the current flowing through the servo motor are calculated for each cycle, and the median of the mean square value and the peak value and the standard deviation of the mean square value and the peak value are calculated for each day. Then, by referring to the table, the waveform of the value of the current flowing through the servo motor is applied to a prescribed pattern to detect a position where an abnormality has occurred. However, the above embodiment is not limited thereto. The mean square value and the peak value for the position deviation of the servo motor may be calculated for each cycle, and the median of the mean square value and the peak value and the standard deviation of the mean square value and the peak value for the position deviation of the servo motor may be calculated for each day. Further, when an abnormality is detected from the median of the mean square value and the peak value and the standard deviation of the mean square value and the peak value for the position deviation of the servo motor for each day, a position where an abnormality has occurred may be detected by selecting, from the prescribed patterns, a pattern to which the waveform of the position deviation of the servo motor is applicable.

As described above, the position deviation of the servo motor may be used as the observed value that is detected in the abnormality detection step or the position detection step and observed.

The position deviation referred to herein is a deviation between a command value relating to a position and the actual position of the robot.

The position deviation of the servo motor may be, for example, a difference between an angular position of the servo motor calculated backward from a position command value and an actual output result by an encoder. When no position command but only a current command and a speed command are given to the servo motor as a command value, the position of the robot during the cycle may be the angular position of the servo motor calculated backward from the data (position data as a function of time).

A description will be given of an aspect in which for the position deviation of the servo motor, the mean square value and the peak value are calculated for each cycle, and the median of the mean square value and the peak value and the standard deviation of the mean square value and the peak value for the position deviation of the servo motor are calculated for each day.

In the prescribed operation of the operation for each cycle of the operation repeatedly performed by the robot, the position deviation of the servo motor is detected for each cycle (cycle position deviation detection step). In the cycle position deviation detection step, the mean square value and the peak value for the position deviation of the servo motor in the prescribed operation are calculated for each cycle.

From the position deviation detected for each cycle, the position deviation for each day is detected (daily position deviation detection step). In the daily position deviation detection step, the median of the mean square value is calculated for each day (position deviation mean square value median calculation step), and the standard deviation of the mean square value is calculated for each day (position deviation mean square value standard deviation calculation step), the median of the peak value is calculated for each day (position deviation peak median calculation step), and the standard deviation of the peak value is calculated for each day (position deviation peak standard deviation calculation step).

In the abnormality detection step, when a representative value of the position deviation for each day deviates from a prescribed range, it is detected that an abnormality has occurred. When the occurrence of the abnormality is detected, a position detection step of detecting the position where the abnormality has occurred is performed.

In the position detection step, from a type of value deviating from the prescribed range of the position deviation for each day detected for a plurality of types, and the waveform of the position deviation of the servo motor at detection of occurrence of the abnormality in the abnormality detection step, the position where the abnormality has occurred is estimated (estimation step).

In this embodiment, the position where an abnormality has occurred is organized on a table in accordance with the type of the value deviating from the prescribed range and the pattern of the waveform of the position deviation of the servo motor at detection of occurrence of the abnormality in the abnormality detection step. In the estimation step, the position where the abnormality has occurred is estimated by referring to the table.

FIGS. 14 and 15 show waveforms of the position deviation of the servo motor when an abnormality occurs. FIG. 14 is a graph showing a waveform of the position deviation of the servo motor when an oscillation tendency is observed with respect to a reference waveform.

When the waveform shown in FIG. 14 is observed in the position deviation of the servo motor, it is determined that the waveform has an oscillation tendency (pattern 5) similarly to the pattern 3 in which the waveform of the current value is observed.

FIG. 15 is a graph showing a waveform of a position deviation of the servo motor when a pulse occurs with respect to the reference waveform.

When the waveform shown in FIG. 15 is observed in the position deviation of the servo motor, it is determined that a pulse is observed in the waveform (Pattern 6), similarly to pattern 4 in which the waveform of the current value is observed.

It is difficult to consider that the waveform of the position deviation of the servo motor is enlarged similarly to the reference waveform due to the mechanism. Therefore, it is difficult to consider that the waveform of the position deviation of the servo motor becomes such a waveform as to be enlarged similarly to the reference waveform. Thus, no determination is made as to whether the waveform of the position deviation of the servo motor is enlarged similarly to the reference waveform.

In order to determine whether the waveform of the position deviation of the servo motor is a waveform with an oscillation tendency (pattern 5) or a waveform with a pulse (pattern 6) is determined from a result of the FFT analysis similarly to the determination from the waveform of the value of the current flowing through the servo motor, the waveform of the position deviation of the servo motor being subjected to the FFT analysis. To which pattern the waveform of the position deviation of the servo motor is applicable is detected after the FFT analysis is subjected to the waveform of the position deviation of the servo motor, similarly to S601 to S603 (FIG. 8) where the waveform of the current of the servo motor is detected.

When the waveform of the position deviation of the servo motor is subjected to the FFT analysis, it is detected whether an intensity of a specific frequency band is 1.5 times or more the intensity of other frequency bands. When the intensity of the specific frequency band is 1.5 times or more the intensity of the other frequency bands, it is detected whether the frequency band is within the specific frequency band.

When there is a frequency band having an intensity that is 1.5 times or more the intensity of the other frequency bands, and the frequency band is within a range of a prescribed frequency band, it is determined that the intensity of the specific frequency band is 1.5 times or more the intensity of the other frequency bands. In this case, it is determined that the waveform has an oscillation tendency, and the waveform of the position deviation of the servo motor at detection of the abnormality is classified into pattern 5.

When the specific frequency band having the intensity 1.5 times or more the intensity of the other frequency bands is not within the range of the prescribed frequency band, it is detected whether the intensity of the specific frequency is 1.5 times or more the intensity of the other frequency bands. That is, it is detected whether there is a portion where the intensity is 1.5 times or more the intensity of other frequency components only in a narrow range of frequency components.

When there is a frequency component having an intensity of 1.5 times or more the intensity of the other frequency bands only in the narrow range of frequency components, it is determined that the waveform has a pulse that protrudes only in a specific frequency component. Therefore, in this case, the waveform of the position deviation of the servo motor at detection of the abnormality is classified into pattern 6.

As described above, it is selected which of pattern 5 or 6 the waveform of the position deviation of the servo motor at detection of occurrence of an abnormality is applicable to (position deviation pattern selection step).

FIG. 16 shows a table relating to a position where an abnormality has occurred in accordance with a type of value deviating from the prescribed range for the position deviation of the servo motor for each day and a waveform pattern of the position deviation of the servo motor when occurrence of the abnormality is detected in the abnormality detection step.

As shown in FIG. 16, when the median of the mean square value for the position deviation of the servo motor exceeds the threshold, an alarm or warning is issued at that point, and the position deviation of the waveform of the servo motor at that time has a pulse, it is estimated that an abnormality has occurred in the harness used in the robot. Here, it is estimated that in particular, the harness connected to the power line of the three-phase motor (line of three-phase motor) suffers from wear, thereby increasing the resistance.

When the median of the mean square value of the position deviation of the servo motor exceeds the threshold, an alarm or warning is issued at that point, the waveform of the servo motor position deviation at that time has an oscillation tendency, it is assumed that an abnormality has occurred in the harness used in the robot. Here, it is estimated that in particular, an instantaneous disconnection has occurred in the harness connected to the power line of the three-phase motor (line of three-phase motor).

Further, when the standard deviation of the peak value for the position deviation of the servo motor exceeds the threshold, an alarm or warning is issued at that point, and the position deviation of the waveform of the servo motor at that time has a pulse, it is estimated that an abnormality has occurred in the harness used in the robot. Here, it is estimated that in particular, an instantaneous disconnection has occurred in the harness connected to the power line of the three-phase motor (line of three-phase motor).

As described above, a table of a relationship between the median and the standard deviation of the mean square value and the median and the standard deviation of the peak value for the position deviation of the servo motor, and the waveform of the position deviation of the servo motor at detection of an abnormality is referred to. Then, the position where the abnormality has occurred can be estimated. The position where the abnormality has occurred can be also estimated when the method is used of detecting the median and the standard deviation of the mean square value, and the median and the standard deviation of the peak value for the position deviation of the servo motor, and detecting a position where an abnormality has occurred on the basis of the waveform of the position deviation.

For example, an abnormality such as a break in the harness is likely to significantly affect the position deviation of the servo motor. Therefore, in order to confirm whether an abnormality has occurred in the harness in a more suitable manner, the median and the standard deviation of the mean square value and the median and the standard deviation of the peak value for the position deviation of the servo motor are calculated. Then, whether the abnormality has occurred is detected from these values. In addition, a position where the abnormality has occurred is detected using the waveform of the position deviation when the abnormality occurs. This makes it possible to more reliably detect whether an abnormality has occurred in the harness.

Further, the abnormality detection step and the position detection step may be performed by using the value of the current flowing through the servo motor and the position deviation of the servo motor in combination. The occurrence of an abnormality is detected from the combined detection result and the position where the abnormality has occurred is detected in the position detection step. As a result, when an abnormality occurs due to deterioration over time in the device, the occurrence of the abnormality can be more reliably detected.

In order to acquire the current value by the current acquisition device 15 shown in FIG. 2, there is a method for directly acquiring a current command value from the calculation unit 14a of the robot 100, and a method for directly acquiring the value of the current flowing through the servo motor by a sensor. However, when a three-phase motor is used as a servo motor, the detection of a value of the current flowing through each phase of the three-phase motor produces three current values, which are AC currents and change from moment to moment. Therefore, it is difficult to fit the three current values into a graph. In order to represent the current value in a graph as a time-series waveform, it is desirable to calculate the current value with one value.

Here, an equation used to acquire the value of the current flowing through the servo motor will be described.

The current (iu, iv, iw) flowing through each phase of the three-phase motor is converted into two axes of an id axis current (id) of a current that does not contribute to torque and an iq axis current (iq) as a torque component current that contributes to torque.

[Equation 1]

$$\begin{bmatrix} id \\ iq \end{bmatrix} = \frac{2}{3} \begin{bmatrix} \cos\theta & \cos\left(\theta - \frac{2\pi}{3}\right) & \cos\left(\theta - \frac{4\pi}{3}\right) \\ \sin\theta & \sin\left(\theta - \frac{2\pi}{3}\right) & \sin\left(\theta - \frac{4\pi}{3}\right) \end{bmatrix} \begin{bmatrix} iu \\ iv \\ iw \end{bmatrix} \quad (1)$$

The currents iu, iv, and iw are balanced three-phase alternating currents, and thus the current of each phase can be expressed as in Equation 2.

[Equation 2]

$$iu = \text{Im}\cos\alpha$$
$$iv = \text{Im}\cos\left(\alpha - \frac{2\pi}{3}\right) \quad (2)$$
$$iw = \text{Im}\cos\left(\alpha - \frac{4\pi}{3}\right)$$

Further, assuming that iq as a stator field current vector and id as a rotor field component vector are controlled so as to be orthogonal to each other, a relationship as in Equation 3 is satisfied (unless the motor is under a special situation, the motor is controlled so as to satisfy the relationship as in Equation 3).

[Equation 3]

$$\theta = \alpha \pm \frac{\pi}{2} \quad (3)$$

Equation 4 is derived from a calculation of Equation 1 using Equations 2 and 3.

[Equation 4]

$$id = 0$$
$$iq = lm \quad (4)$$

The sum of the squares of each phase current is calculated using a relationship of Equation 4.

[Equation 5]

$$iu^2 + iv^2 + iw^2 = \tfrac{3}{2} iq^2 \quad (5)$$

By transforming Equation 5, Equation 6 is derived.

[Equation 6]

$$\frac{1}{3}(iu^2 + iv^2 + iw^2) = \frac{1}{2} iq^2 = \left(\frac{iq}{\sqrt{2}}\right)^2 \quad (6)$$

From Equation 6, $iq/(2)^{1/2}$ can be used as the current command value.

As described above, the current value is calculated with one value, a time-series waveform of the current command value can be represented in a graph. Accordingly, when the torque by the servo motor is constant, the torque component current value iq is constant, and can be easily calculated as one current value.

In this embodiment, $iq/(2)^{1/2}$ can be used as the current value. Thus, when the current value of the servo motor is used as the observed value in the abnormality detection step, the mean square value and the peak value of the current value can be calculated for each cycle. It is thus possible to calculate a representative value of the value of the current flowing through the servo motor for each cycle. Further, a representative value of a current value for each day can be calculated from the representative value of the current value calculated for each cycle.

Further, the waveform of the value of the current flowing through the servo motor can be represented in a graph. This makes it possible to select which of the plurality of preset patterns the waveform of the current value is applicable to when an abnormality occurs. As a result, the position where the abnormality has occurred can be easily estimated.

REFERENCE SIGNS LIST 100 robot
50 controller

The invention claimed is:

1. A method for estimating a position where an abnormality has occurred in a robot that drives an arm using a servo motor, the method comprising:
   an abnormality detection step of detecting that an abnormality has occurred;
   a position detection step of detecting, when occurrence of the abnormality is detected in the abnormality detection step, a position where the abnormality has occurred;
   a cycle observed value detection step of observing a transition of a value of a current flowing through the servo motor or a position deviation of the servo motor as an observed value, and detecting a representative value of the observed value for each cycle in a prescribed operation of an operation for each cycle in an operation repeatedly performed by the robot; and
   a daily observed value detection step of detecting a representative value of the observed value for each day from the representative value of the observed value detected for each cycle, wherein
   when the representative value of the observed value for each day deviates from a prescribed range, the occurrence of the abnormality is detected in the abnormality detection step.

2. The method for estimating a position where an abnormality has occurred according to claim 1, wherein the position detection step includes an estimation step of estimating a position where the abnormality has occurred from a type of value deviating from the prescribed range of the representative value of the observed value for each day detected for a plurality of types, and a waveform of the observed value when the occurrence of the abnormality is detected in the abnormality detection step.

3. The method for estimating a position where an abnormality has occurred according to claim 2, wherein
   the position where the abnormality has occurred is organized on a table in advance in accordance with the type of value deviating from the prescribed range and the waveform of the observed value when the occurrence of the abnormality is detected in the abnormality detection step, and
   the position where the abnormality has occurred is estimated by referring to the table in the estimation step.

4. The method for estimating a position where an abnormality has occurred according to claim 2, wherein
   in the cycle observed value detection step, a mean square value and a peak value of the observed value in the prescribed operation are calculated for each cycle, and
   the daily observed value detection step includes:
      a mean square median calculation step of calculating a median of the mean square value for each day,
      a mean square standard deviation calculation step of calculating a standard deviation of the mean square value for each day,
      a peak median calculation step of calculating a median of the peak value for each day, and
      a peak standard deviation calculation step of calculating a standard deviation of the peak value for each day.

5. The method for estimating a position where an abnormality has occurred according to claim 4, wherein the occurrence of the abnormality is detected in the abnormality detection step, when any one of values deviates from a prescribed range, the values being the median of the mean square value calculated in the mean square median calculation step, the standard deviation of the mean square value calculated in the mean square standard deviation calculation step, the median of the peak value calculated in the peak median calculation step, and the standard deviation of the peak value calculated in the peak standard deviation calculation step.

6. The method for estimating a position where an abnormality has occurred according to claim 2, wherein the estimation step includes a selection step of selecting which pattern among a plurality of preset patterns of the waveform of the observed value at detection of the occurrence of the abnormality in the abnormality detection step is applicable to.

7. The method for estimating a position where an abnormality has occurred according to claim 6, wherein
   the observed value is a value of a current flowing through the servo motor,
   in the selection step, pattern 1 is defined when the waveform of the current flowing through the servo motor at detection of the occurrence of the abnormality in the abnormality detection step is enlarged similarly to a reference waveform of the current flowing through the servo motor without the occurrence of the abnormality, and an enlargement ratio is equal to or less than a threshold, pattern 2 is defined when the enlargement ratio is greater than the threshold, pattern 3 is defined when there is a frequency at which a component of the waveform of the current flowing through the servo motor is larger than the reference waveform by a certain amount or more, and the frequency is within a prescribed frequency range, and pattern 4 is defined when the frequency is not within the prescribed frequency range, and
   the selection step includes a current value pattern selection step of selecting which one of patterns 1 to 4 the waveform of the current flowing through the servo motor at detection of the occurrence of the abnormality in the abnormality detection step is applicable to.

8. The method for estimating a position where an abnormality has occurred according to claim 6, wherein
   the observed value is a position deviation of the servo motor,
   in the selection step, pattern 5 is defined when there is a frequency at which a component of the waveform of the position deviation of the servo motor at detection of the occurrence of the abnormality in the abnormality detection step is larger than a reference waveform of the position deviation of the servo motor without the occurrence of the abnormality by a certain amount or more, and the frequency is within a prescribed frequency range, and pattern 6 is defined when the frequency is not within the prescribed frequency range, and
   the selection step includes a position deviation pattern selection step of selecting which one of patterns 5 and 6 the waveform of the position deviation of the servo motor at detection of the occurrence of the abnormality in the abnormality detection step is applicable to.

9. A non-transitory computer readable medium storing thereon a program for estimating a position where an abnormality has occurred in a robot that drives an arm using a servo motor, the program causing a computer to execute:
- an abnormality detection step of detecting that an abnormality has occurred;
- a position detection step of detecting, when occurrence of the abnormality is detected in the abnormality detection step, a position where the abnormality has occurred;
- a cycle observed value detection step of observing a transition of a value of a current flowing through the servo motor or a position deviation of the servo motor as an observed value, and detecting a representative value of the observed value for each cycle in a prescribed operation of an operation for each cycle in an operation repeatedly performed by the robot; and
- a daily observed value detection step of detecting a representative value of the observed value for each day from the representative value of the observed value detected for each cycle, wherein when the representative value of the observed value for each day deviates from a prescribed range, the occurrence of the abnormality is detected in the abnormality detection step.

\* \* \* \* \*